United States Patent
Ito et al.

(10) Patent No.: US 7,053,587 B2
(45) Date of Patent: May 30, 2006

(54) APPARATUS FOR CONTROLLING THREE-PHASE AC MOTOR ON TWO-PHASE MODULATION TECHNIQUE

(75) Inventors: Takeshi Ito, Nagoya (JP); Hiroya Tsuji, Yokkaichi (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/053,843

(22) Filed: Feb. 10, 2005

(65) Prior Publication Data

US 2005/0194925 A1 Sep. 8, 2005

(30) Foreign Application Priority Data

Feb. 10, 2004 (JP) ............................ 2004-033965
Feb. 12, 2004 (JP) ............................ 2004-035529

(51) Int. Cl.
*H02P 7/42* (2006.01)

(52) U.S. Cl. ...................... 318/801; 318/802; 318/729; 318/721

(58) Field of Classification Search ........ 318/801–811, 318/719, 721, 729, 723, 599; 363/160
See application file for complete search history.

(56) References Cited

U.S. PATENT DOCUMENTS

| | | | |
|---|---|---|---|
| 4,847,743 A | | 7/1989 | Kamiyama |
| 5,990,657 A | * | 11/1999 | Masaki et al. .............. 318/811 |
| 6,002,234 A | * | 12/1999 | Ohm et al. ................. 318/729 |
| 6,462,492 B1 | * | 10/2002 | Sakamoto et al. .......... 318/254 |
| 6,626,002 B1 | * | 9/2003 | Notohara et al. .......... 62/228.4 |
| 2004/0056629 A1 | * | 3/2004 | Maeda et al. ............... 318/719 |
| 2004/0245948 A1 | * | 12/2004 | Sakai et al. ................. 318/254 |
| 2005/0001582 A1 | * | 1/2005 | Goto et al. ................. 318/802 |
| 2005/0017671 A1 | * | 1/2005 | Tobari et al. ............... 318/802 |
| 2005/0046369 A1 | * | 3/2005 | Kobayashi et al. ......... 318/432 |
| 2005/0174090 A1 | * | 8/2005 | Hayashi ..................... 318/807 |
| 2005/0179334 A1 | * | 8/2005 | Yoshinaga ............. 310/156.47 |
| 2005/0190005 A1 | * | 9/2005 | Katsuki et al. ............. 332/109 |

FOREIGN PATENT DOCUMENTS

| | | |
|---|---|---|
| JP | B2 2577738 | 11/1996 |
| JP | B2 2718058 | 11/1997 |
| JP | A 11-262269 | 9/1999 |

* cited by examiner

*Primary Examiner*—Paul Ip
(74) *Attorney, Agent, or Firm*—Oliff & Berridge, PLC

(57) ABSTRACT

An apparatus is provided to control a three-phase AC motor and comprises an inverter and a controller. The inverter powers the motor in response to a three-phase PWM command. The control circuit controls the inverter based on two modulation techniques selectively switched from one the other depending on information indicative of an operation state of the motor. One modulation technique gives the PWM command a first two-phase modulation allowing each phase voltage to be fixed at a predetermined voltage level in turn at intervals of an electrical angle of $2\pi/3$. The other modulation technique gives the PWM command a second two-phase modulation allowing each phase voltage to be fixed at a predetermined voltage in turn at intervals of an electrical angle of $\pi/3$. The switchover can be made between the two-phase and three-phase modulations or can be made with consideration of temperature at switching elements.

43 Claims, 15 Drawing Sheets

THREE-PHASE MODULATED VOLTAGE COMMANDS

THREE-PHASE MODULATED VOLTAGE COMMANDS (2π/3)

TWO-PHASE MODULATED VOLTAGE COMMANDS ($2\pi/3$)

TWO-PHASE MODULATED VOLTAGE COMMANDS ($\pi/3$)

■ MODE A

■ MODE B

APPARATUS FOR CONTROLLING THREE-PHASE AC MOTOR ON TWO-PHASE MODULATION TECHNIQUE

CROSS REFERENCES TO RELATED APPLICATIONS

The present application relates to and incorporates by reference Japanese Patent applications No. 2004-33965 filed on Feb. 10, 2004 and No. 2004-35529 filed on Feb. 12, 2004.

BACKGROUND OF THE INVENTION

1. Field of the Invention

The present invention relates to an apparatus for controlling a three-phase AC (alternating current) motor on a two-phase modulation technique.

2. Description of the Related Art

In various applications of electronic motors, a higher need for reducing loss caused in the motors has arisen, partly due to environmental problems. This is also true of a PWM (pulse width modulation) inverter to operate a three-phase AC motor.

The PWM control for the three-phase AC motor is usually based on a three-phase modulation technique. However, one recent trend for the PWM control is to use a two-phase modulation technique which can be divided into two types.

One type of two-phase modulation technique is called "$\pi/3$-fixing type" (which is sometimes called "fixed-phase 60-degree switchover type"), which is taught by some references. The two-phase modulation technique employs the fact that a motor current depends on phase-to-phase voltage, not on the phase voltages. Hence, the inverter is driven such that, with the phase-to-phase voltages kept at a predetermined voltage, switching elements assigned to each phase are switched "on" for a predetermined period of time so as to fix its phase voltage at a high power-supply voltage level or a low power supply-voltage level during a period of time corresponding to an electrical angle of $\pi/3$ (60 degrees). Fixing the voltage at the predetermined power-supply voltage level is performed in sequence for each of the three phases U, V and W, so that the loss caused due to switching in the converter (switching loss) can be reduced.

The other type of two-phase modulation technique is called "$2\pi/3$-fixing type" (which is sometimes called "fixed-phase 120-degree switchover type"), which is taught by, for example, Japanese Patent Publication No. 2577738 and Japanese Patent Laid-open Publication No. 11-262269. In those publications, each phase voltage is fixed at a high or low power-supply voltage level for a predetermined interval of time corresponding to an electrical angle of $2\pi/3$ (120 degrees) and this phase control is carried out for each of the phases U, V and W in sequence to reduce the switching loss in the inverter.

An additional configuration in the foregoing patent publication is to stop operating the motor on the two-phase modulation and, instead, apply three-phase voltages to the motor, if the amplitude of each phase voltage is smaller.

The above motor is very frequently used as an electric motor for running an electric vehicle, hybrid vehicle, and others. Such motors are necessary to operate in all the four quadrants of a two-dimensional motor-output coordinate defined by the two axes assigned to torque and the number of rotations of the motor. In terms of this requirement, the foregoing "$2\pi/3$-fixing type" is insufficient, because the switching loss cannot be fully suppressed in some operation ranges showing higher speeds and larger amounts of torque.

In the case of the foregoing "$\pi/3$-fixing type," a fixing period of time at each fixed phase and positive and negative peaks of phase current flowing each phase can be synchronized with each other. Compared to "$2\pi/3$-fixing type," a higher suppression of the switching loss is therefore gained. However, it has been pointed out that, when the output voltage is smaller in amplitude, switchover timing for the fixed phases tends to be erroneous, thus failing to keep a well-controlled two-phase-modulation operation of the motor.

In addition, the foregoing switchover between the three-phase modulation drive and the two-phase modulation drive on "$2\pi/3$-fixing type" do not always operate well. This is attributable to the fact that the three-phase voltages provide time-dependent AC waveforms which are likely to undergo mixing with noise voltage so that precision in switchover timing becomes poor. In other words, the switchover that relies upon detection of the amplitudes of the three-phase voltages has a difficulty in sufficiently reducing the switching loss.

Meanwhile, in mounting a large-sized motor, such as three-phase AC motor for running a running a vehicle, into a vehicle engine room, it is extremely strictly important to suppress the temperature of the switching arm elements of the inverter.

SUMMARY OF THE INVENTION

In light of the above-described problems, an object of the present invention is to provide a motor control apparatus that is able to operate a three-phase AC motor, with avoiding, in a greater or less degree, the fixed phases from being switched in a deteriorated condition, while still reducing the switching loss caused in an inverter for PWM control incorporated in the apparatus.

A further object of the present invention is to provide a motor control apparatus that is able to reduce a maximum temperature of each switching element of the inverter to be controlled on a two-phase modulation technique, without making a cooling system for the inverter larger in its construction.

To achieve the above-described object, as one aspect of the present invention, there is provided an apparatus for controlling a three-phase AC motor, comprising: an inverter operatively connected to the motor to power the motor in response to a three-phase PWM command; and a control circuit controlling the inverter based on two modulation techniques selectively switched from one the other depending on information indicative of an operation state of the motor, one of the two modulation techniques giving the PWM command a two-phase modulation allowing each of three phase voltages of the motor to be fixed at a predetermined voltage level in turn at intervals of an electrical angle of $\pi/3$.

Preferably, the information indicative of the operation state of the motor is a phase voltage of the motor and the other of the two modulation techniques giving the PWM modulation a three-phase modulation; and wherein the control circuit includes determination means determining whether or not the phase voltage is equal to or larger than a given value and commanding means selectively commanding the three-phase modulation in cases where it is determined that the phase voltage is less than the given value and the two-phase modulation in cases where it is determined that the phase voltage is larger than the given value.

By way of example, the motor is an on-vehicle motor producing power for rung the vehicle.

As another aspect of the present invention, there is provided an apparatus for controlling a three-phase AC motor, comprising: an inverter operatively connected to the motor to power the motor in response to a three-phase PWM command; and a control circuit controlling the inverter based on two modulation techniques selectively switched from one the other depending on information indicative of an operation state of the motor, one of the two modulation techniques giving the PWM command a first two-phase modulation that allows each of three phase voltages of the motor to be fixed at a predetermined voltage level in turn at intervals of an electrical angle of $2\pi/3$, the other of the two modulation techniques giving the PWM command a second two-phase modulation that allows each of three phase voltages of the motor to be fixed at a predetermined voltage level in turn at intervals of an electrical angle of $\pi/3$.

It is preferred that the information is an amplitude of a phase voltage of the motor, wherein the control circuit include first determining means for determining whether or not the amplitude of the phase voltage is equal to or larger than a given threshold and commanding means for commanding the first two-phase modulation when it is determined that the amplitude of the phase voltage is less than the threshold and the second two-phase modulation when it is determined that the amplitude of the phase voltage is equal to or larger than the threshold.

It is still preferred that the information indicative of the operation state of the motor being defined as a map having a two-dimensional coordinate with four quadrants, and the map including a first region containing an origin of the coordinate and ordering the three-phase modulation and a second region surrounding the first region in the coordinate and ordering the two-phase modulation.

It is preferred that the information is a two-dimensional coordinate point decided by a q-axis current and a d-axis current in the motor and the coordinate of the map is defined by mutually-orthogonal two axes assigned to the q-ads and d-axis currents.

It is also preferred that the information is a two-dimensional coordinate point by an amount of torque caused in the motor and the number of rotations of the motor and the coordinate of the map is defined by mutually-orthogonal two axes assigned to the torque and the number of rotations.

As another aspect of the present invention, there is provided an apparatus for controlling a three-phase AC motor, comprising: an inverter operatively connected to the motor to power the motor in response to a three-phase PWM command, the inverter being equipped with three element pairs each including an upper arm element and a lower upper element each of which receives modulated voltages responding to the three-phase PWM command, a control circuit controlling the inverter based on a first and second two-phase modulaton techniques selectively switched from one the other at intervals or alternately depending on information indicative of an operation state of the motor and each giving the PWM command a two-phase modulation that allows each of three phase voltages of the motor to be fixed at a predetermined voltage level in turn at intervals of an electrical-angle of $2\pi/3$, the first two-phase modulation technique involving the upper arm element assigned to a phase to be subjected to fixing the phase voltage being switched on and the lower arm element thereat being switched off and the second two-phase modulation technique involving the upper arm element assigned to a phase to be subjected to fixing the phase voltage being switched off and the lower arm element thereat being switched on.

BRIEF DESCRIPTION OF THE DRAWINGS

In the accompanying drawings:

FIG. 15 shows waveforms of two-phase modulated voltage commands on a "$2\pi/3$-fixing technique" involving upper arm elements to be switched on;

FIG. 16 shows waveforms of two-phase modulated voltage commands on a "$2\pi/3$-fixing technique" involving lower arm elements to be switched on;

DETAILED DESCRIPTION OF THE PREFERRED EMBODIMENTS (First Embodiment)

Referring to FIGS. 1–10, a first embodiment of a motor control apparatus according to the present invention will now be described.

Figure 1:
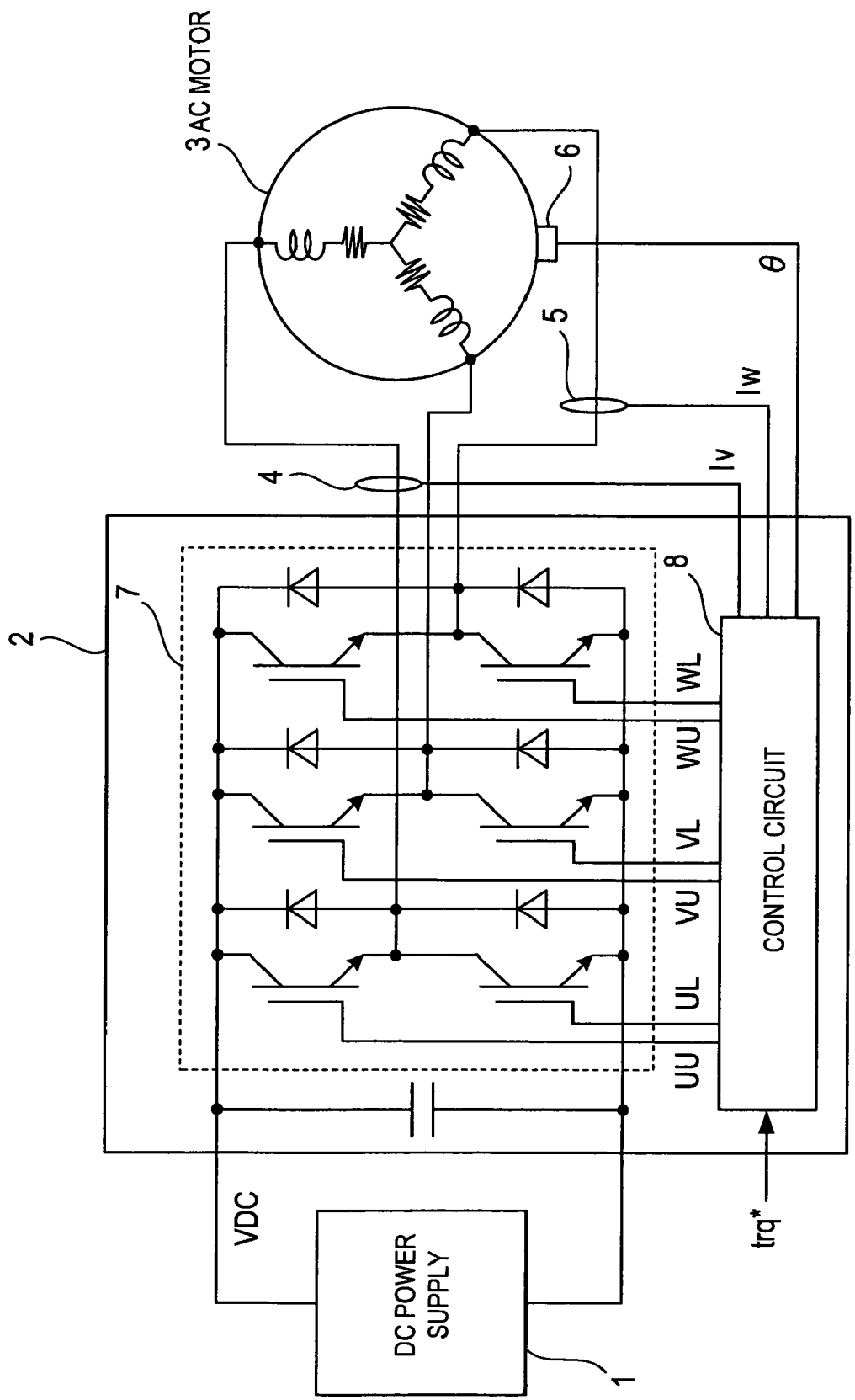
FIG. 1 shows an outlined electric configuration of a motor apparatus equipped with a motor control apparatus according to a first embodiment of the present invention.

FIG. 1 outlines the electric configuration of a motor apparatus, which includes the motor control apparatus according to the present embodiment. As shown, the motor apparatus is provided with a DC (direct current) power supply 1, driver 2, and three-phase AC synchronous motor 3, in addition to two current sensors 4 and 5 and motor rotation sensor 6. The motor 3 is for example an on-vehicle motor producing power for running a vehicle such as hybrid car.

Of these, the current sensors 4 and 5 are in charge of detecting signals indicative of phase currents. The motor-rotation sensor 6 is in charge of detecting a signal to show an electrical angle indicative of the rotation of the motor 3 and which serves as motor rotational position detecting means.

The driver 2 is equipped with an inverter 7 and a control circuit 8. The inverter 7 has switching elements to be controlled on a PWM control technique. Thus the inverter 7 allows DC power from the DC power supply 1 to be converted into three-phase AC power under the PWM control so that the converted AC power is provided for the three-phase synchronous motor 3. The control circuit 8 is placed to make the switching elements turn on/off in a controlled fashion. To be specific, the inverter 7 has six element units each composed of a parallel connection of an IGBT (Insulated Gate Bipolar Transistor) and a flywheel diode. Each IGBT has a higher-potential-side upper-arm element and a lower-potential-side lower arm element. The IGBT, which serves as the switching element, can be replaced by other elements such as MOS (Metal Oxide Semiconductor) transistor. Preferably, an AMOS (N-channel MOS) transistor can be used as the MOS transistor. Both configuration and operations of this kind of three-phase inverter have been well known, so no more explanations can be given.

Incidentally, the motor rotation sensor 6 may be omitted from the above configuration, provided that the circuit design is made such that an electric angle (i.e., phase) θ is computed from phase currents to be detected.

Figure 2:
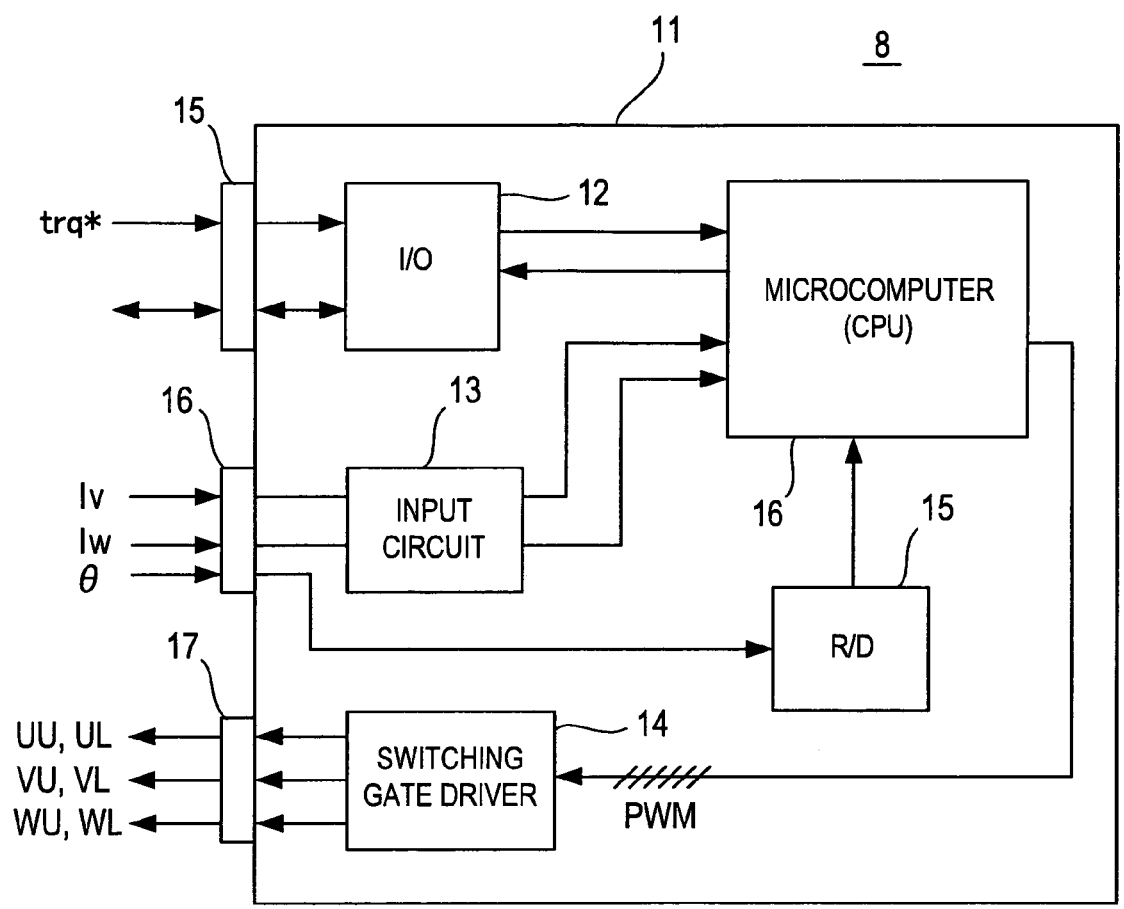
FIG. 2 shows the physical electric configuration of a control circuit incorporated in the motor control apparatus according to the first embodiment (FIG. 2 also explains second, third and fourth embodiments of the present invention)
Figure 3:
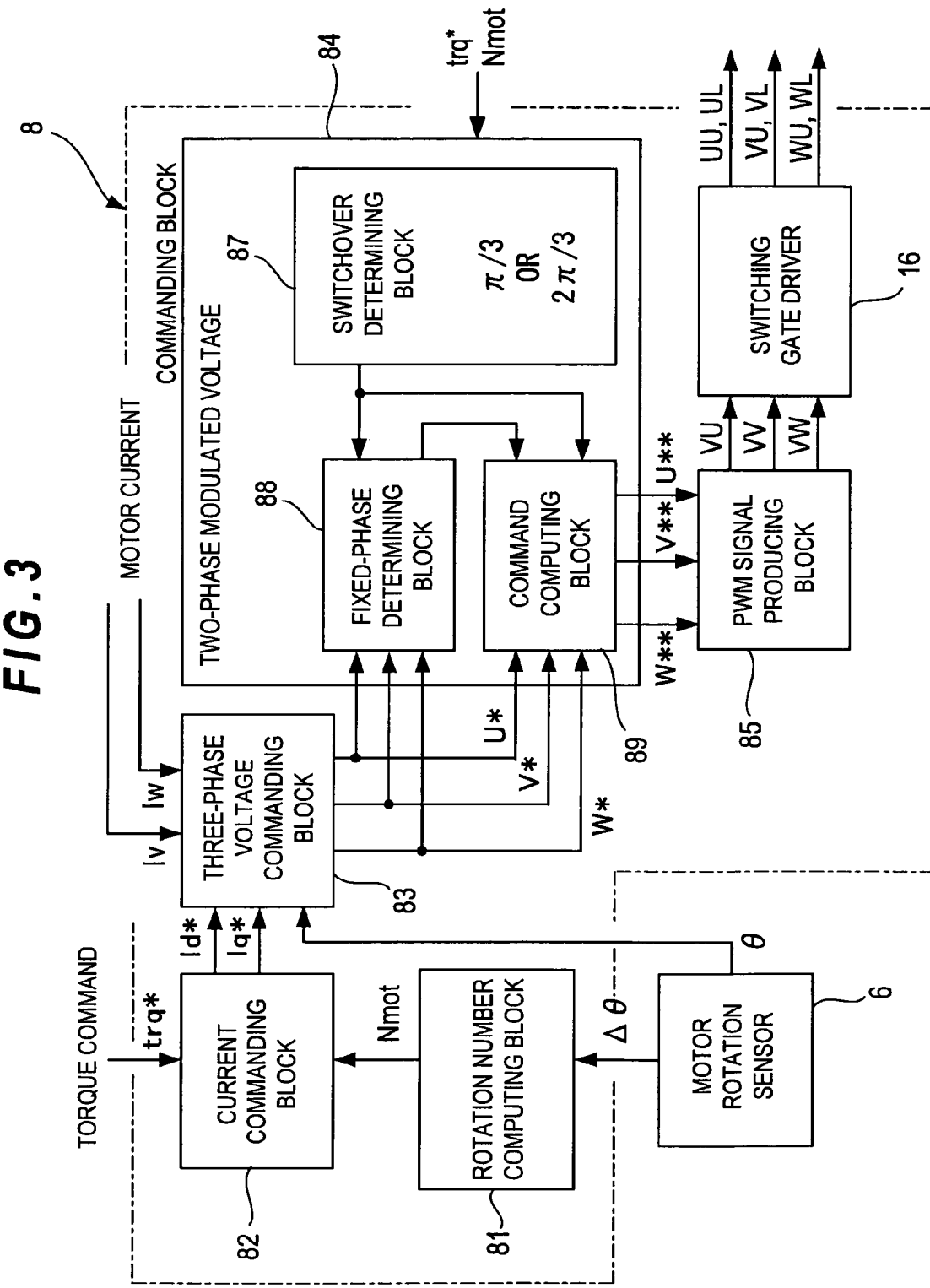
FIG. 3 shows a functional configuration which is functionally attained with the operations of circuitry of the control circuit.

Referring to FIGS. 2 and 3, the control circuit 8 will then be described as to its configuration and operations.

FIG. 2 shows a physical electric configuration of the control circuit 8, while FIG. 3 shows a functional configuration which can be functionally attained with the operations of circuitry of the control circuit 8.

At first, an explanation will be given to the physical electric configuration of the control circuit 8. As shown in FIG. 2, there is provided a circuit board 11 on which an input/output interface 12, input circuit 13, switching gate driver 14, R/D (Resolver/Digital) converter 15 and microcomputer 16 (including a CPU, ROM, RAM, and timer) are mounted with electrical connections thereamong made through buses. Equipped with the circuit board 11 are connectors 15, 16 and 17, as shown.

The operations by the constituents (except the switching gate driver 14) of the control circuit 8 attain the functions depicted by the functional blocks 81 to 89, as shown in FIG. 3. To be specific, the control circuit 8 is able to have a motor rotation-number computing block 81 (hereinafter, simply referred to as "rotation-number computing block 81"), dq-axes current command producing block 82 (hereinafter, simply referred to as "current commanding block 82"), three-phase voltage command producing block 83 (hereinafter, simply referred to as "three-phase voltage commanding block 83"), two-phase modulated voltage command producing block 84 (hereinafter, simply referred to as "two-phase modulated voltage commanding block 84"), and PWM signal producing block 85 connected to the switching gate driver 14.

Among those blocks, the rotation-number computing block 81 receives from the sensor 6 a signal indicating the electrical angle θ of the motor 3 to compute the number of rotations of the motor 3, Nmot. This block 81 gives the number of computed rotations to the current commanding block 82, which also receives a torque command trq* in relation to the magnitude and direction of torque.

The current commanding block 82 uses both the torque command trq* and the number of rotations of the motor 3 to compute commands (dq-axes current commands) for both of a d-axis current id* and a q-axis current iq* which are currents that should flow through the motor 3. This block 82 provides the three-phase voltage commanding block 83 with the dq-axes current commands.

The three-phase voltage commanding block 83 also receives the signal indicating the motor rotation angle θ as well as signals indicative of phase currents actually detected by the sensors 5 and 6. This block 83 uses the received signals to convert the detected phase currents Iv and Iw to actual dq-axes currents (d-axis current id and q-axis current iq) through dq-axes conversion, compute current differences Δid and Δiq assigned to the coordinate axes, respectively, and compute three-phase voltage commands U*, V* and W* by applying the PI calculation to such current differences Δid and Δiq so that the current differences Δid and Δiq converge to zero, respectively. The computed three-phase voltage commands U*, V* and W* are then given to the two-phase modulated voltage commanding block 84.

Upon reception of those commands U*, V* and W*, the commanding block 84 operates to produce two-phase modulated voltage commands U, V and W so that those commands U, V and W are provided for the PWM signal producing block 85. In response to this reception, the producing block 85 will engage in producing three-phase PWM voltages VU, W, and VW corresponding to the two-phase modulated voltage commands U, V and W**.

The three-phase PWM voltages VU, VV, and VW, which are produced by the PWM signal producing block 85, are outputted to the switching gate driver 86, wherein they are subjected to power-amplification to produce six gate voltages UU, UL, VU, VL, WU and WL. These gate voltages are applied respectively to gate electrodes of the switching elements that compose the inverter 7.

The control circuit 8 can be outlined as above, which is similar to that of a two-phase modulated motor control apparatus which is conventionally known. Accordingly, only part of the configurations of the control circuit 8, which is different from the conventional, will now be detailed thereinafter.

The above difference lies in the two-phase modulated voltage commanding block 84, which is typical of the present invention. As shown in FIG. 3, this block 84 functionally includes a two-phase modulation mode switchover determining block 87 (hereinafter referred to as "switchover determining block 87"), a phase-being-fixed determining block 88 (hereinafter referred to as "fixed-phase determining block 88), and a voltage commands computing block 89 (hereinafter referred to as "command computing block 89").

At first, in order to grasp the entire concept, the above blocks 87, 88 and 89 will be outlined briefly block by block, before detailing them.

The switchover determining block 87 receives signals indicating a torque command value trq* and the number of rotations Nmot of the motors 3 and has a map previously stored in the block 87. Hence this switchover determining block 87 makes reference to the map with both the torque command value trq* and the number of rotations so as to determine a two-phase modulation mode which should be employed currently. This block 87 will be detailed later again in an appropriate order.

The fixed-face determining block 88 is responsible for determination of a phase to be fixed in compliance with the two-phase modulation mode decided by the switchover determining block 87. By this determination, both of a phase to be fixed and timing for fixing the phase are figured out, the fixing being made based on the three-phase voltage commands U*, V* and W*. This block 87 will be detailed later as well.

Further, the command computing block 89 applies processing to the three-phase voltage commands U*, V* and W*, such that, of these commands, a phase voltage command for a phase to be fixed is selected and fixed at a predetermined potential to be decided from the currently specified two-phase modulation mode and the remaining two phase voltage commands are changed to sustain predetermined phase-to-phase voltages.

Figure 4:
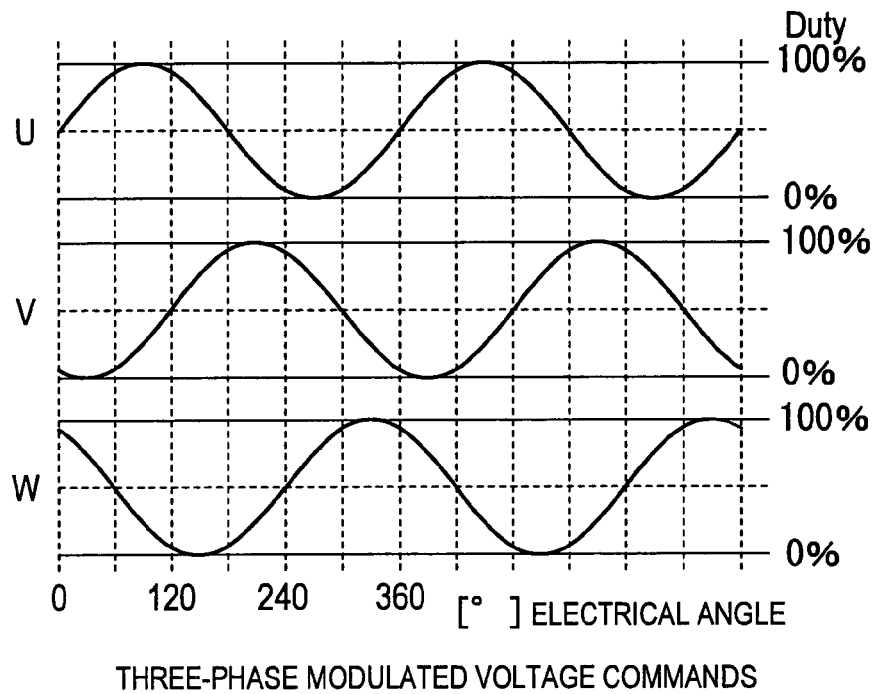
FIG. 4 is a graph showing the waveforms of three-phase modulated voltage commands (or command voltages) produced for the three phases U, V and W, respectively.
Figure 6:
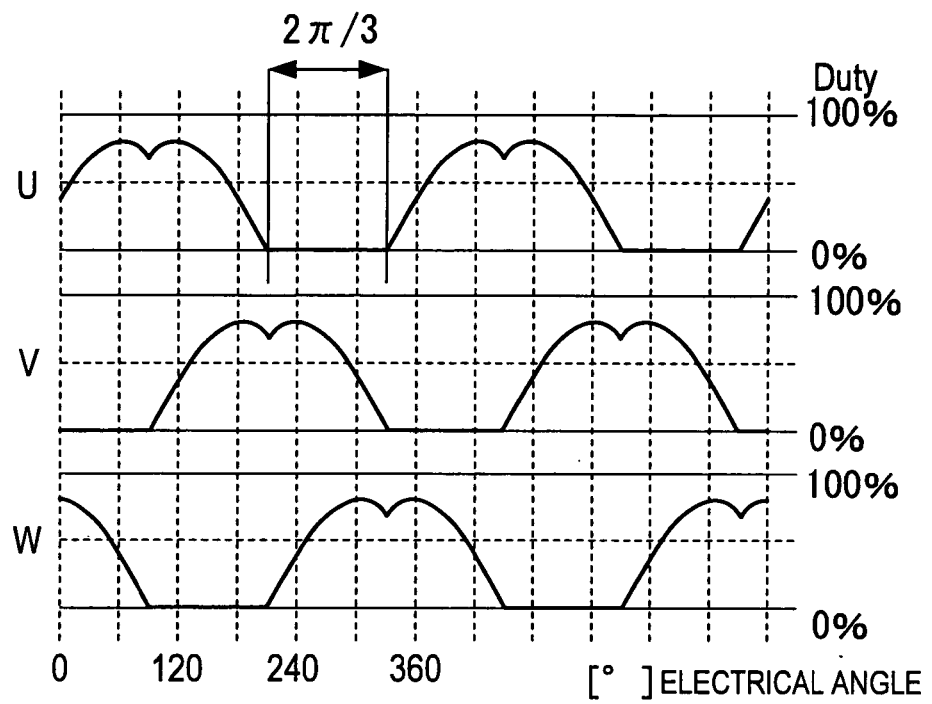
FIG. 6 is a graph showing the waveforms of two-phase modulated voltage commands on a "$2\pi/3$-fixing technique" with a lower-arm fixing technique.
Figure 7:
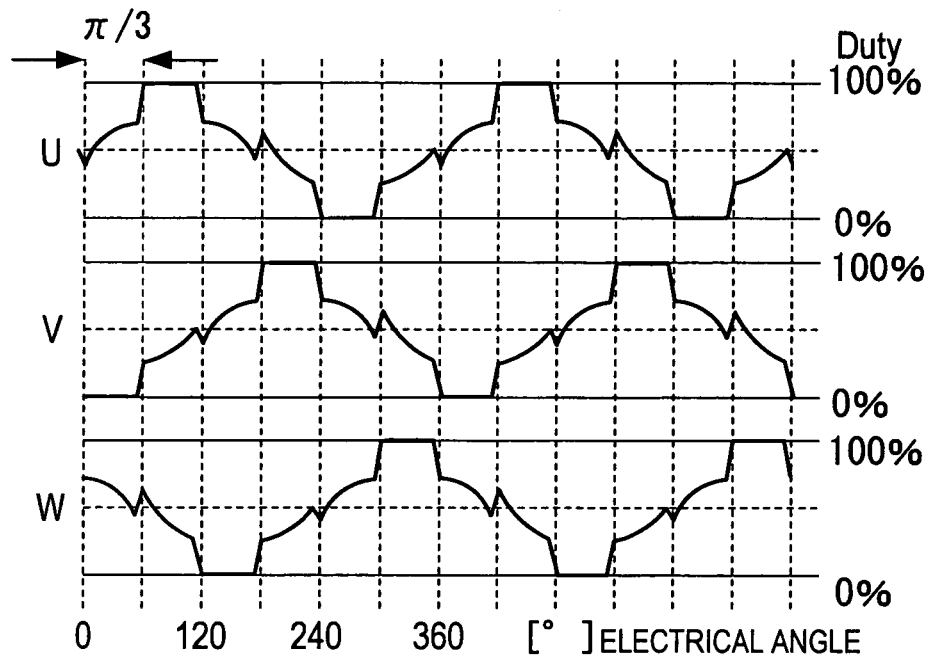
FIG. 7 is a graph showing the waveforms of two-phase modulated voltage commands on a "$\pi/3$-fixing technique"

Hence, as understood from the foregoing, the three-phase modulated voltage commands U*, V* and W* inputted to the two-phase modulated voltage commanding block 84 are converted to the two-phase modulated voltage commands U, V and W**, respectively. Waveforms of the three-phase modulated voltage commands U*, V* and W* are illustrated in FIG. 4, waveforms of two-phase modulated waveforms on the "2π/3-fixing technique" are illustrated in FIGS. 5 and 6, and waveforms of two-phase modulated waveforms on the "π/3-fixing technique" are illustrated in FIG. 7.

Figure 5:
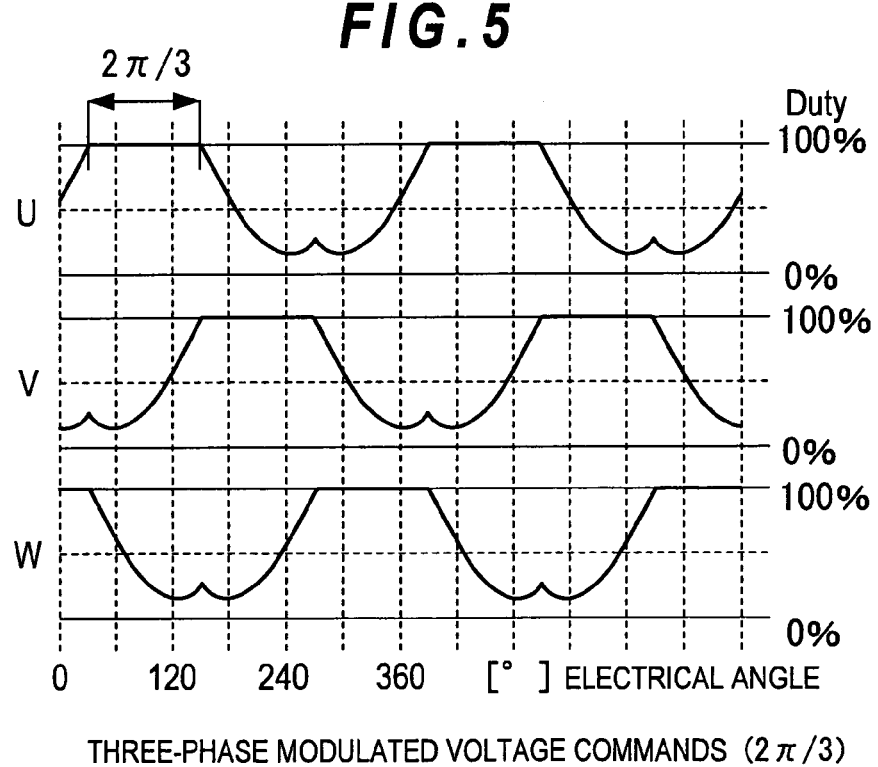
FIG. 5 is a graph showing the waveforms of two-phase modulated voltage commands on a "$2\pi/3$-fixing technique" with an upper-arm fixing technique.

The waveforms in FIG. 5 illustrate a technique, called upper-arm fixing technique, with which an upper arm element of each phase (i.e., winding) to be fixed potentially is continuously put "on" so that the potentially fixed period is repeated at intervals of 2π/3 as a whole, because the phase voltage commands for the respective phases to be potentially fixed are kept in turn at their maximums at intervals of 2π/3. In contrast, the waveforms shown in FIG. 6 illustrate a technique, called lower-arm fixing technique, with which a lower arm of each phase (i.e., winding) to be fixed potentially is continuously put "on" so that the potentially fixed period is repeated at intervals of 2π/3 as a whole, because the phase voltage commands for the respective phases to be potentially fixed are kept in turn at their maximums at intervals of 2π/3.

In the present embodiment, the "2π/3-fixing technique" is employed with the lower-arm fixing technique, but this is not a definitive list. An alternative is that the upper-arm fixing technique may be employed. Both of the upper and lower-arm fixing techniques may also be employed one after the other.

Figure 8:
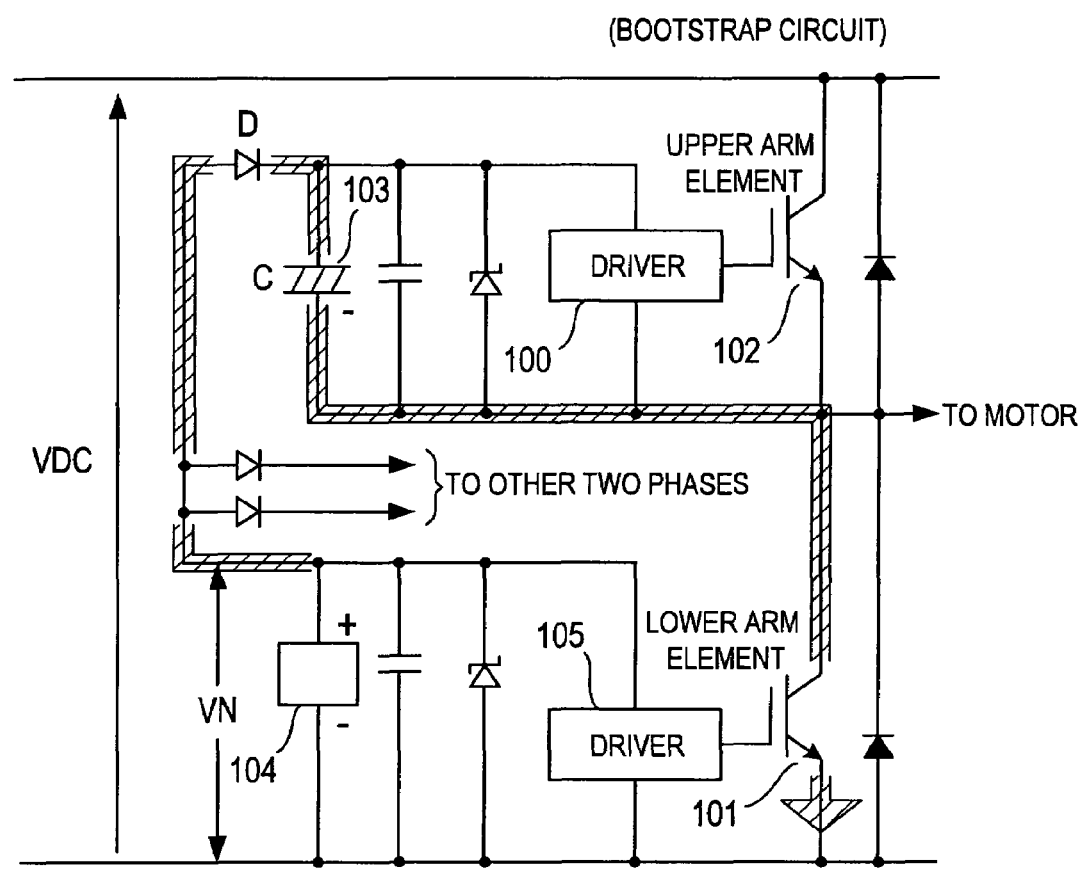
FIG. 8 is a circuit diagram exemplifying part of a drive circuit incorporated in the control circuit, the drive circuit driving each par of switching elements included phase by phase by an inverter and being equipped with a bootstrap circuit for driving the upper switching element (upper arm) of each pair.

The reason why the present embodiment employs the "lower-arm fixing technique" together with the "2π/3-fixing technique" is the cost for manufacturing the circuit. Specifically, when the lower-arm element (i.e., the lower switching element) 101 is put "on" and the upper arm element (i.e., the upper switching element) 102 is put "off," a power supply circuit 103 powering a driver 100 for driving the upper arm element 102 can be formed into a bootstrap circuit as shown in FIG. 8. This power supply circuit can prevent a reduction in the voltage of the power supply voltage 103, so that the cost for manufacturing the circuit can be lessened. To be more specific, when turning the lower arm element 101 "on," the potential at the point connecting the lower and upper arm elements 101 and 102 is reduced. A capacitor 103, which serves as the power supply circuit for powering the driver 100 for driving the upper arm element 102, can be charged via a diode D by voltage VN of a power supply 104 for powering a driver 105 for driving the lower arm element 101.

(Switchover Determining Block 87)

The switchover determining block 87 will now be detailed in terms of its operations.

This block 87 is in charge of switching the modulation modes between the two-phase modulation mode on the "2π/3-fixing technique" and the two-phase modulation mode on the "π/3-fixing technique" "2π/3-fixing technique" depending on operation conditions of the motor 3. To realize this switching, this block 87 uses a map shown in FIG. 9. The map is formed in a memory such as ROM incorporated in the control circuit 8. The map is previously given two dimensions, which are amounts of the torque and the number of rotations. Thus the torque command trq* and the number of motor rotations Nmot are made reference to the map to determine which one of the "2π/3-fixing technique" and the "π/3-fixing technique" should be used.

Figure 9:
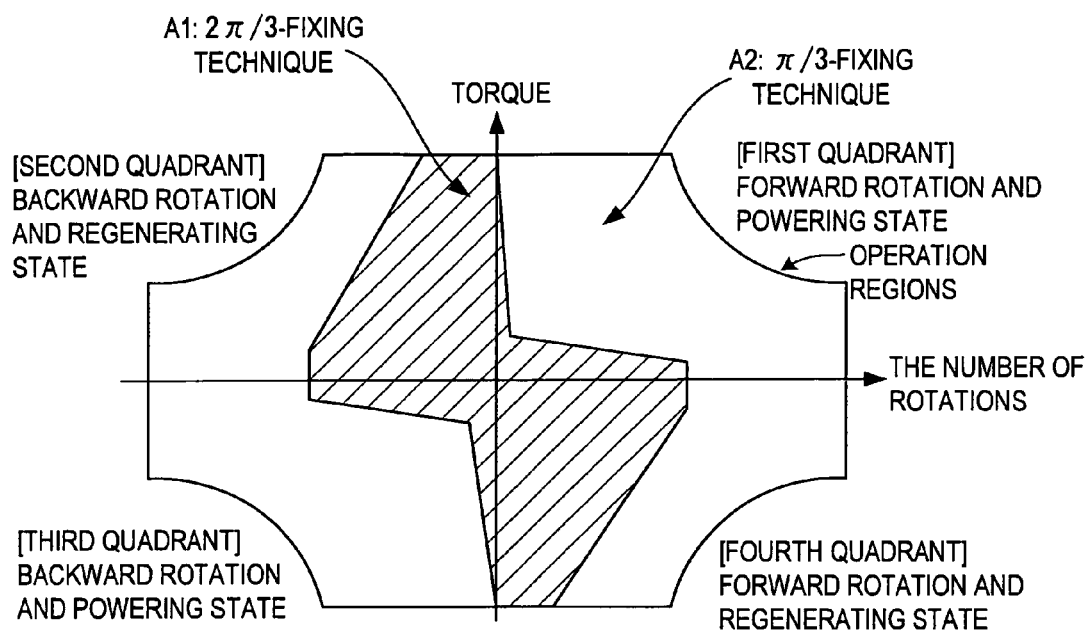
FIG. 9 pictorially shows a map in which two operation ranges are depicted so as to be defined by the torque and the number of rotations of a motor, the two operation ranges being depicted on the "$\pi/3$-fixing technique (interior range)" and the "$2\pi/3$-fixing technique (exterior range)", both of which are for the two-phase modulation.

The map shown in FIG. 9 is formed into a two dimensional coordinate with a longitudinal axis assigned to the torque and a lateral axis assigned to the number of rotations. This two-dimensional coordinate has inner and outer regions A1 and A2, in which the inner region A1 exists to include the origin and shows a range directed to the operations on the "2π/3-fixing technique" and the outer region A2 exists to surround the inner region A1 and shows a range directed to the operations on the "π/3-fixing technique." In FIG. 9, both of the inner and outer regions A1 and A2 are divided into four quadrants. The first quadrant expresses forward rotation and powering state, the second one backward rotation and regenerating state, the third one backward rotation and powering state, and the fourth one forward rotation and regenerating state. As depicted in FIG. 9, as to the inner region A1 on the "2π/3-fixing technique," the area sizes in the second and fourth quadrants for the regenerating states are larger than those in the first and third quadrants for the powering states. The reason is that, compared to the quadrants showing the powering states, phase voltage commands for the quadrants showing the regenerating states tend to be smaller in their amplitudes, even when the same amount of torque is required. In FIG. 9, it is preferred that the inner regions A1 (i.e., a predetermined region according to the present invention) is decided to correspond to a region in which the amplitude of a phase voltage is less than a predetermined level.

Figure 10:
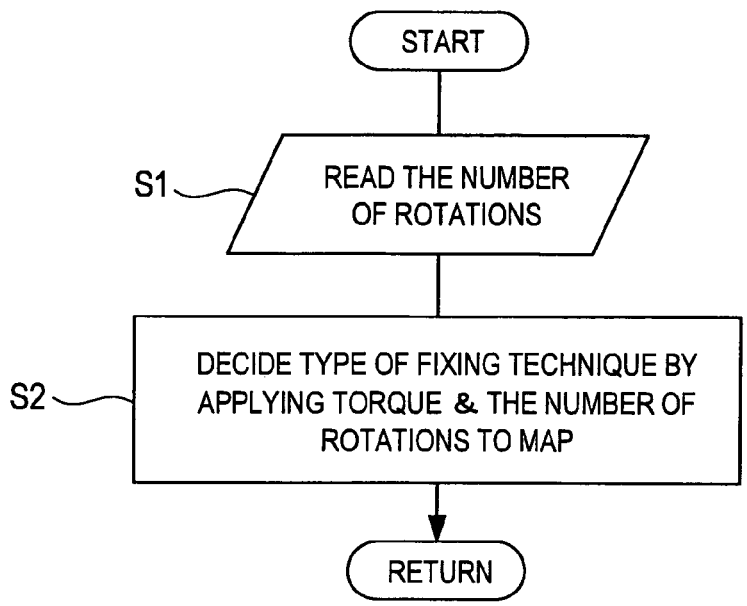
FIG. 10 is an outlined flowchart performed in the first embodiment, the flowchart exemplifying how to selectively switch both the "$\pi/3$-fixing technique" and the "$2\pi/3$-fixing technique"

A flowchart shown in FIG. 10, which explains the operations of the switchover determining block 87, will now be explained. This determining block 87 may be formed into a hardware circuit to operate in the identical manner to the software operations shown in FIG. 10. The determining block reads in signals indicative of an amount of torque and the number of rotations of the motor 3 to obtain those values (step S1). The block 87 then decides either modulation mode of the two-phase modulation mode on the "2π/3-fixing technique" or the two-phase modulation mode on the "π/3-fixing technique" "2π/3-fixing technique" by applying both the read-in torque and the number of rotations to the map shown in FIG. 9 (step S2).

(Fixed-Face Determining Block 88)

According to the current technique selected from the "2π/3-fixing technique" and the "π/3-fixing technique," the fixed-face determining block 88 operates to fix a phase voltage command to be issued, as shown in FIG. 5 or 6 and 7.

The "2π/3-fixing technique" on the upper-arm fixing technique, as shown in FIG. 5, applies processing to the three-phase voltage commands U*, V* and W* in such a manner that, of those three commands, a phase voltage command for one phase, which has the largest amplitude during each period of 2π/3 repeated by turns phase by phase, is fixed at 1 (its duty is 100%) and the phase voltage commands for the remaining two phases are shifted to allow the three-phase phase-to-phase voltages to form sinusoidal waves during the same period of 2π/3.

In contrast, the "2π/3-fixing technique" on the lower-arm Sing technique, as shown in FIG. 6, applies processing to the three-phase voltage commands U*, V* and W* in such a manner that, of those three commands, a phase voltage command for one phase, which have the lowest amplitude during each period of 2π/3 repeated by turns phase by phase, is fixed at zero (its duty is 0%) and the phase voltage commands for the remaining two phases are shifted to allow the three-phase phase-to-phase voltages to form sinusoidal waves during the same period of 2π/3.

In the case of the "π/3-fixing technique" for the two-phase modulation, as shown in FIG. 7, of the three three-phase voltage commands U*, V* and W*, a phase voltage command for one phase, whose polarity is different from the remaining two, is fixed at 1 (duty is 100%) or zero (duty is 0%) during each period of π/3 depending on the polarity, while the phase voltage commands for the remaining two phases are shifted as below during the same period of π/3. For instance, when U*>0, V*<0 and W*<0, the command for U* is fixed at 1 (duty is 100%), with the commands for V* and W* shifted to hold the predetermined phase-to-phase voltages against U*. When U*<0, V*>0 and W*>0, the command for U* is fixed at zero (duty is 0%) and the commands for V* and W* are shifted to hold the predetermined phase-to-phase voltages against U*. This is true of the commands V* and W*.

As a result, in the present embodiment, the two-phase modulation can be executed over all the operation ranges (i.e., over all the first to fourth quadrants) defined by the torque and the number of rotations, as shown in FIG. 9. The two-phase modulation is superior to the three-phase modulation, because the number of switching times carried by the inverter operating on the two-phase modulation is less than that on the three-phase modulation. That is, the two-phase modulation is smaller in the switching loss than the three-phase modulation, thereby improving the efficiency of the inverter.

A further advantage resulting from the present embodiment is to employ, at the same time, both the "2π/3-fixing technique" and the "π/3-fixing technique. The 2π/3-fixing technique" makes it possible that the two-phase modulation is conducted steadily in the operation region A1 on the map, in which the operation region A1 makes the "π/3-fixing technique" difficult to be conducted, due to the fact that the amplitude of the phase voltage is small in such regions on the map. Meanwhile, in the other operation regions A2 on the map, the "π/3-fixing technique" which provides less switching loss is employed selectively. Hence, switchovers between both techniques become steadier and more accurate. In addition, the "π/3-fixing technique," which presents the largest reduction in the switching loss, can be best used.

(First Modification)

Figure 11:
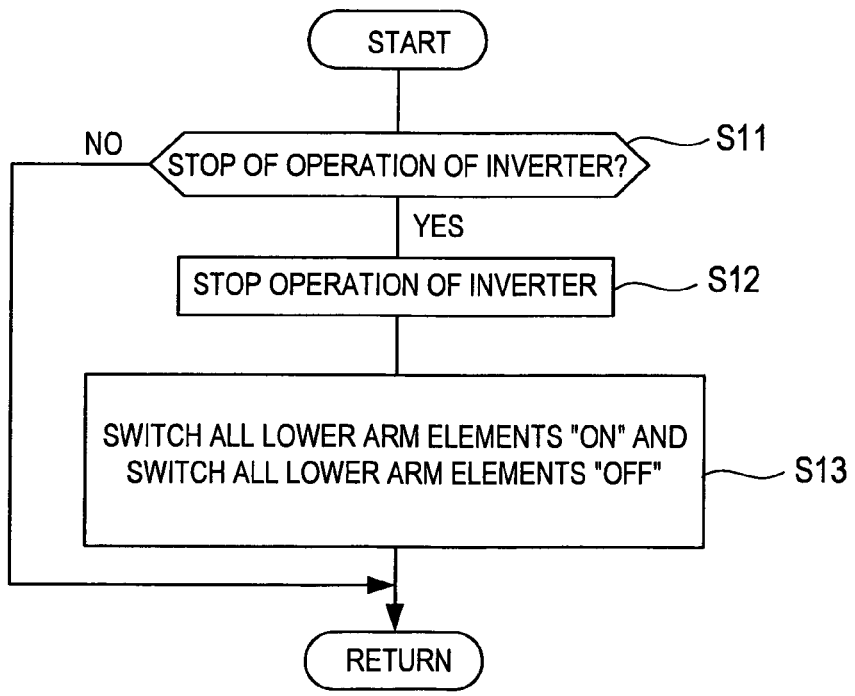
FIG. 11 is an outlined flowchart performed in a first modification of the first embodiment, the flowchart showing the switchovers to be performed immediately after the stop of the inverter.

A first modification relates to a further control of the inverter 7. To be specific, all the three lower arm elements are switched on, while all the three upper arm elements are switched off. That is, the control circuit 8 is designed to operate on a flowchart roughly shown in FIG. 11, in which the determination whether or not an inverter stop command has been read in is made (step S11). When this determination is YES, the inverter 7 is made to stop operating (step S12). Then all the lower arm elements are switched on and all the upper arm elements are switched off (step S13).

Accordingly, in the bootstrap circuit shown in FIG. 8, ting on all the lower arm elements 101 enables the voltage VN of the power supply 104 to quickly charge the capacitor 103, the power supply 104 powering the driver circuit for driving the lower arm elements 101 and the capacitor 103 powering the driver circuit 100 for driving the upper arm elements 102. This quick charge at the capacitor 103 allows the inverter to be driven well at the next timing set at shorter intervals.

(Second Modification)

Figure 12:
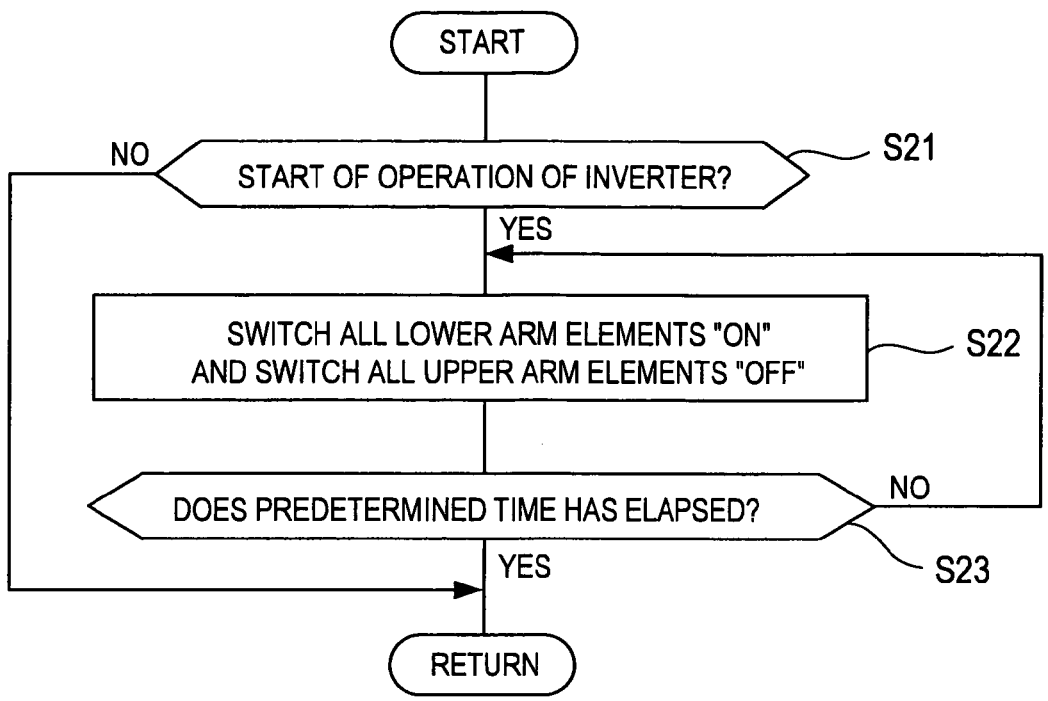
FIG. 12 is an outlined flowchart performed in a second modification of the first embodiment, the flowchart showing the switchovers to be performed immediately after the start of the inverter.

A second modification relates to another control of the inverter 7. FIG. 12 outlines a flowchart on which the inverter 7 is controlled by the control circuit 8. Specifically, as shown therein, it is determined whether or not the inverter 7 has been actuated, by detecting an inverter actuation command (step S21). If it is determined YES, all the upper arm elements are switched on and all the lower arm elements are switched off (step S22). This arm element control continues for a predetermined period of time after activating the inverter 7 (step S23).

This control of the upper and lower arm elements 102 and 101 results in that, for only the predetermined period of time immediately after the activation of the inverter 7, the capacitor 103 is charged. Like the first modification, in the bootstrap circuit shown in FIG. 8, turning on all the lower arm elements 101 enables the voltage VN of the power supply 104 to quickly charge the capacitor 103. This quick charge at the capacitor 103 also allows the inverter to be driven well at the next timing set at shorter intervals.

(Third Modification)

A third modification is concerned with control of the inverter 7 in the case of occurring an error or trouble in the inverter 7 and motor 3.

Figure 13:
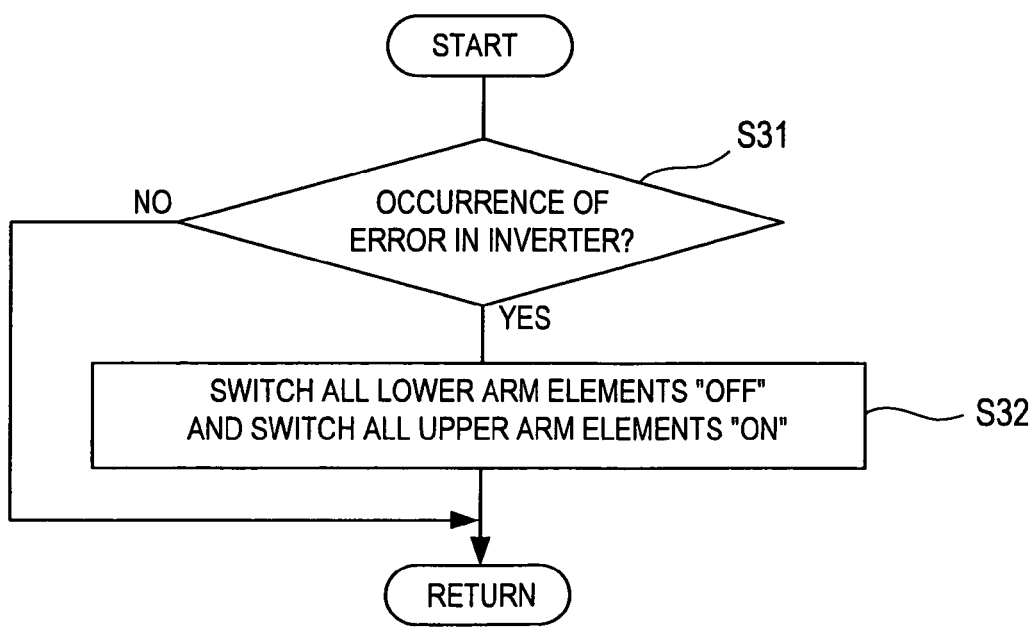
FIG. 13 is an outlined flowchart performed in a third modification of the first embodiment, the flowchart showing the switchovers to be performed when an error or trouble has been detected.

As shown in FIG. 13, the control circuit 8 determines whether or not such an error or trouble occurs using appropriate sensing or calculation means (step S31). When it is determined YES, all the upper arm elements 102 are switched off and all the lower arm elements 101 are switched on in the bootstrap circuit shown in FIG. 8 (step S32).

This control allows the capacitor 103, i.e., the power supply for driving the upper arm elements 102, to be discharged, which disables the turn on of the upper arm elements 102, thus prohibiting the inverter 7 from operating any more. As a result, the inverter 7 is protected from the error or trouble in a more secured manner.

(Second Embodiment)

Referring again to FIG. 2, a second embodiment of the motor control apparatus according to the present invention will now be described. In this second embodiment, the identical or similar components to those in the first embodiment will be given the same reference numerals, so that the explanations for those can be simplified or omitted for the sake of avoiding redundant explanations. This explanation manner is also true of the subsequent embodiments and modifications.

While in the foregoing first embodiment, the switchovers are made between the "2π/3-fixing techniques and the "π/3-fixing technique" on the basis of the torque and the number of rotations of the motor 3, those switchovers can be made, like the conventional, in response to the amplitudes of the three-phase voltage commands U*, V* and W*.

In order to perform such switchovers, the switchover determining block 87 is configured to receive the three-phase voltage commands U*, V* and W* to detect the amplitudes thereof. And this determining block 87 determines if or not, of the three commands the three-phase voltage commands U*, V* and W*, a specified one-phase command has an amplitude lager than a given threshold. When this determination is affirmative, the "π/3-fixing technique" is selected, while when it is negative, the 2π/3-fixing technique" is selected. This technique selection is conducted in turn for each phase voltage command.

In selecting the techniques as described above, instead of the mere amplitude of each phase voltage command, the amplitude of a root-mean-square value of each phase voltage command may be used or the amplitude of a lower-frequency component of the phase voltage command may be used.

As a result, the present embodiment is still effective, because the two-phase modulation can be performed, whereby the efficiency of the inverter 7 can be improved. This is because the two-phase modulation with less switching loss (i.e., the number of switching loss becomes smaller than that in the three-phase modulation) can be performed over all the operation ranges defined by the four quadrants shown in FIG. 9.

(Third Embodiment)

Referring again to FIG. 2, a third embodiment of the motor control apparatus according to the present invention will now be described.

This embodiment employs a further configuration to switchably select both the "2π/3-fixing technique" and the "π/3-fixing technique." Concretely, instead of making reference to the map based on the torque and the number of rotations, further physical amounts can be used in the present embodiment. That is, both of the q-axis current command value Iq* and the d-axis current command value Id* outputted from the current commanding block 82 in FIG. 2 are used by the switchover determining block 87. Those commands Iq* and Id* are applied to a map stored in the block 87 in order to switchably select the "2π/3-fixing technique" and the "π/3-fixing technique." The map formed in the block 87 has a two-dimensional coordinate with both a q-axis current command value Iq* assigned to the longitudinal axis and a d-axis current command value Id* assigned to the lateral axis, as shown in FIG. 21.

Figure 21:
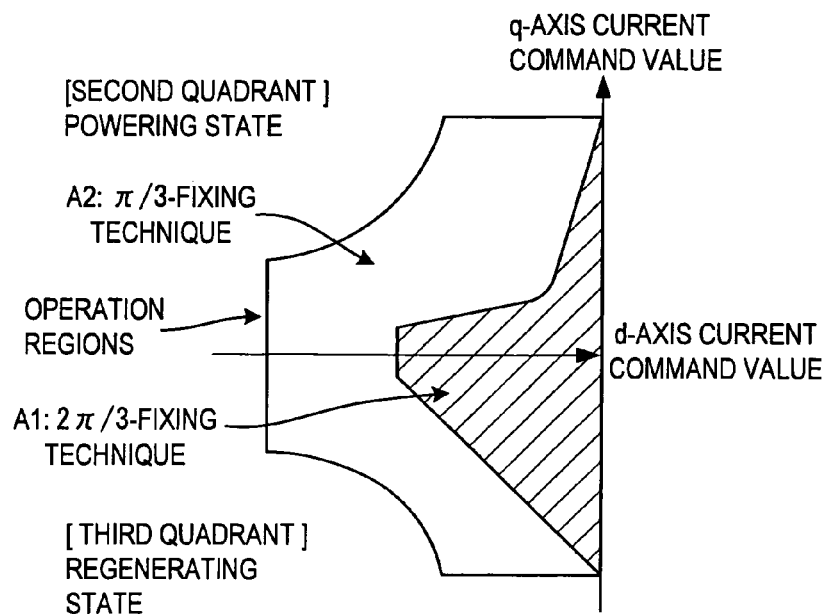
FIGS. 21 and 22 are illustrations of modifications.

The map shown in FIG. 21, which is just one example, is defined in the coordinate on the currents, wherein the rotation directions are neglected. The map consists of the second quadrant for the powering state and the third quadrant for the regenerating state in such a manner that the commands in those quadrants are improved to efficiency of the motor.

In this two-dimensional map, as shown in FIG. 21, coordinate locations defined by q-axis current command values Iq* and d-axis current command values Id* which provide phase current commands whose amplitudes are lower than a given threshold are designated as an operation region A1 for the "2π/3-fixing technique." The remaining operation region A2 in the two-dimensional map are designated as a region for the "π/3-fixing technique. Of course, this map is previously stored in a memory incorporated in the switchover commanding block 87.

Like the forgoing various embodiments, the two-phase modulation on either one selected from the "2π/3-fixing technique" and the "π/3-fixing technique" is therefore carried out over all the operation quadrants for the motor 3, whereby the efficiency of the inverter 7 can be raised. In addition, the two-modulation using the "2π/3-fixing technique" can be performed in the operation region A1 wherein the "π/3-fixing technique" is difficult to employ, due to the fact that the phase voltage is lower in some ranges of the map defined by the q-axis and d-axis current command values Iq* and Id*. In the remaining region A2 of the map, the switchover is made to the "2π/3-fixing technique" that provides less switching less. Thus, the switchover between both the techniques can be done in a stable and accurate manner.

(Fourth Embodiment)

Referring again to FIG. 2, a fourth embodiment of the motor control apparatus according to the present invention will now be described.

This embodiment employs a further configuration of switchably selecting both the "2π/3-fixing technique" for the two-phase modulation and the "three-phase modulation," not the switchover between the "2π/3-fixing technique" and "π/3-fixing technique" which both are for the two-phase modulation. The switchover according to the present embodiment is commanded by the switchover commanding block 87 shown in FIG. 2. However a map stored in this block 87 provides both a π/3-fixing range on the two-phase modulation and a three-phase modulation range. This map can employ as its two dimensions the torque and the number of rotations, like the first embodiment, or the q-axis and d-as current command values Iq* and Id* so as to form the two selective operative regions in the map. Moreover, for the three-phase modulation, the fixed-face determining block 88 is designed to disregard the fixing of any phase voltage command and the command computing block 89 is designed, without any processing applied thereto, to output the three-phase voltage commands U*, V* and W* that have been inputted thereto.

Figure 22:
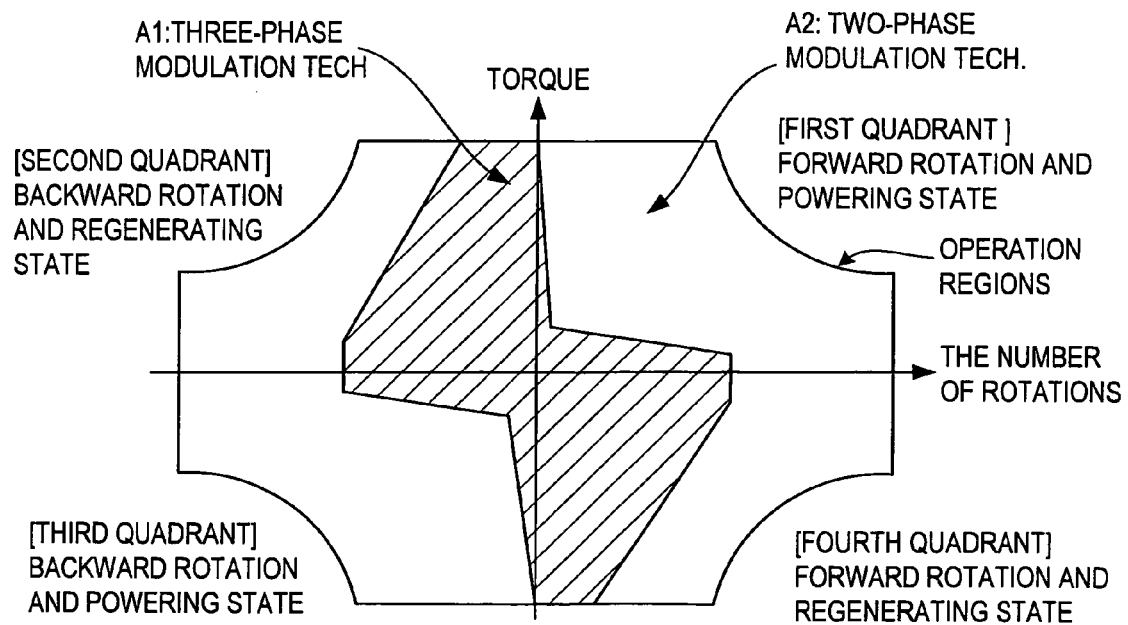

Hence, in the operation region A1 wherein the amplitude of a phase voltage defined by the torque and the number of rotations is small (refer to FIG. 22) or in the operation region A1 wherein the amplitude of a phase voltage indicated by the q-axis and d-axis current command values Iq* and Id* is small, the modulation mode is set differently from the amplitude itself of a phase voltage. That is, in such an operation region A1, the three-phase modulation can be designated, which is less fluctuations in the time, because of not being sinusoidal wave functions, and is with precision.

(Fifth Embodiment)

Referring to FIGS. 14–18, a fifth embodiment of the motor control apparatus according to the present invention will now be described.

The present embodiment relates to the switchover control which is carried out between the "2π/3-fixing technique" with the "upper-arm fixing technique" and the "2π/3-fixing technique" with the "lower-arm fixing technique" in consideration of temperature at the upper and lower arm elements.

Figure 14:
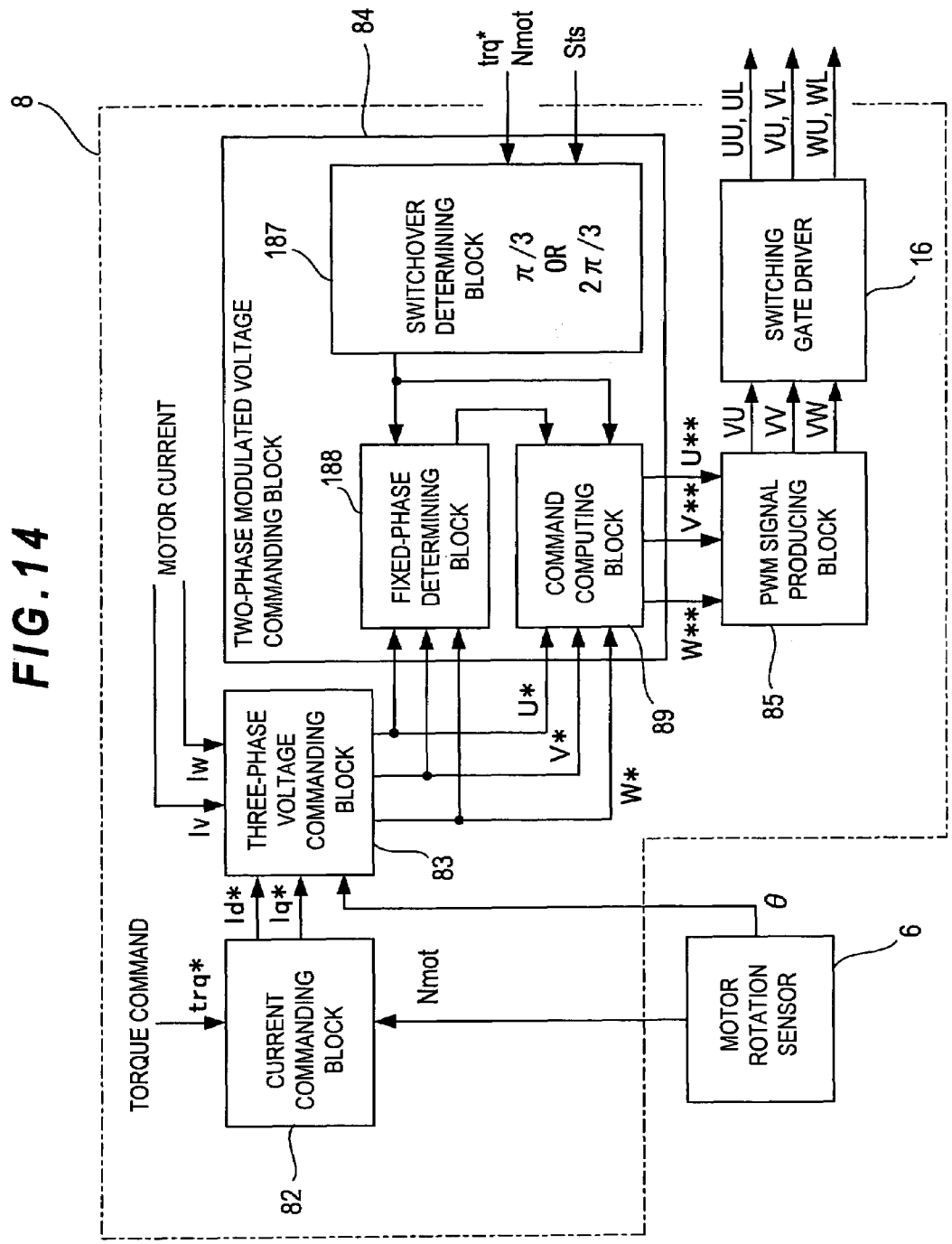
FIG. 14 shows a functional configuration which is functionally attained with the operations of circuitry of a control circuit in a fifth embodiment and other embodiments of the present invention.

The entire configuration of the motor apparatus according to this embodiment can be expressed similarly to that shown in FIG. 1, but the motor apparatus has a control circuit 8' which is different in terms of its functional configurations from that in the first embodiment. Compared to the control circuit 8 shown in FIG. 1, the control circuit 8' of this embodiment, as shown in FIG. 14, has not the "rotation-number computing block 81" and has a "two-phase modulated voltage commanding block 184" different from that shown in FIG. 1. In this block 184, the "switchover determining block 87" and "fixed-face determining block 88" in FIG. 1 are replaced by a "switchover determining block 187" and a "fixed-phase determining block 188" are placed, respectively.

A motor rotation sensor 6', which is attached to the motor 8 similarly to the sensor 6 shown in FIG. 1, has the capability of sensing the rotation angle of the motor 3 and using the sensed results to compute a signal indicating the number of rotations of the motor 3, Nmot, and an electrical angle θ of the motor 3. The signal inactive of the number of rotations Nmot is supplied to the "current commanding block 82," while the signal indicative of the electrical angle θ is provided to the "three-phase voltage commanding block 83."

In the present embodiment, particularly, the "switchover determining block 187" and the "fixed-phase determining block 188" have distinctive features from those in the first embodiment.

The "switchover determining block 187" includes a software timer to count the clock pulse and determines if the count of the timer reaches a given amount. And the block 187, which manages two modulation modes, switches the current modulation mode to the other one, when it is determined that the count has reached the given amount.

Figure 15:
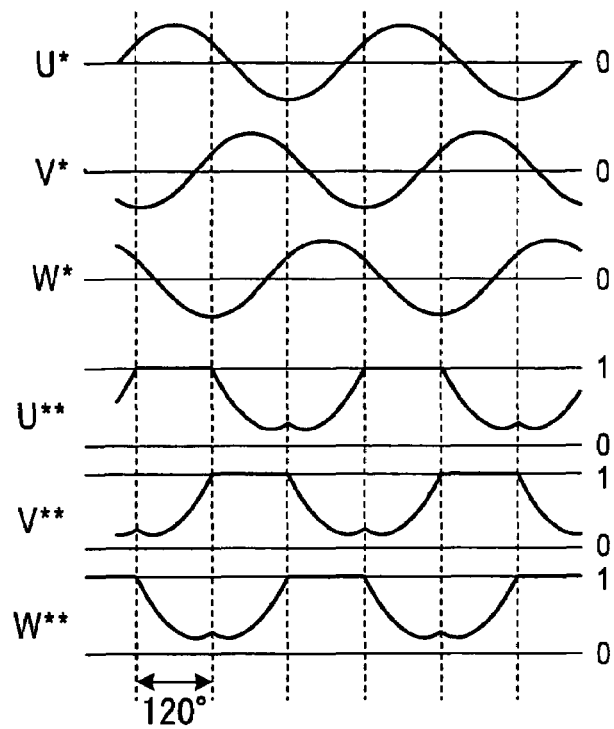
Figure 16:
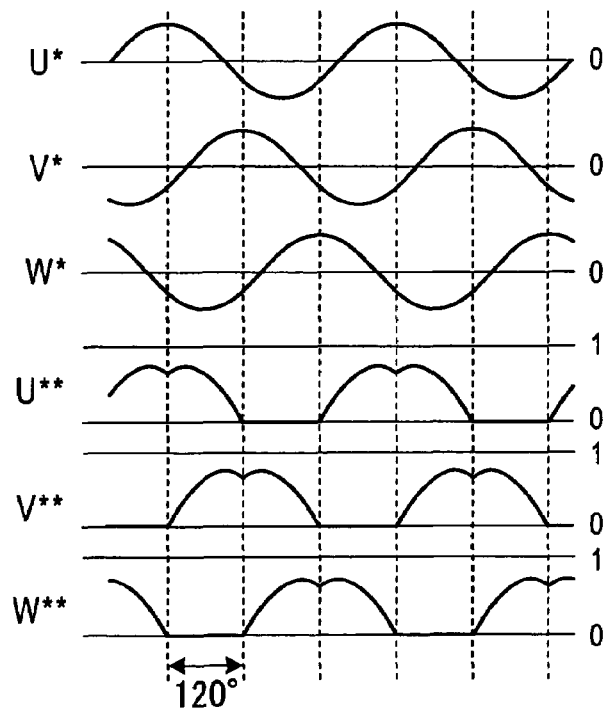

Those modulation modes are the "2π/3-fixing technique" with "the upper arm fixing technique," which is hereinafter called "mode A" and the "2π/3-fixing technique" with "the lower arm fixing technique," which is hereinafter called "mode B." As to these modes, the waveforms of three-phase voltage commands U*, V* and W* and two-phase modulated voltage commands U, V and W** are shown in FIGS. 15 and 16, respectively.

Figure 17:
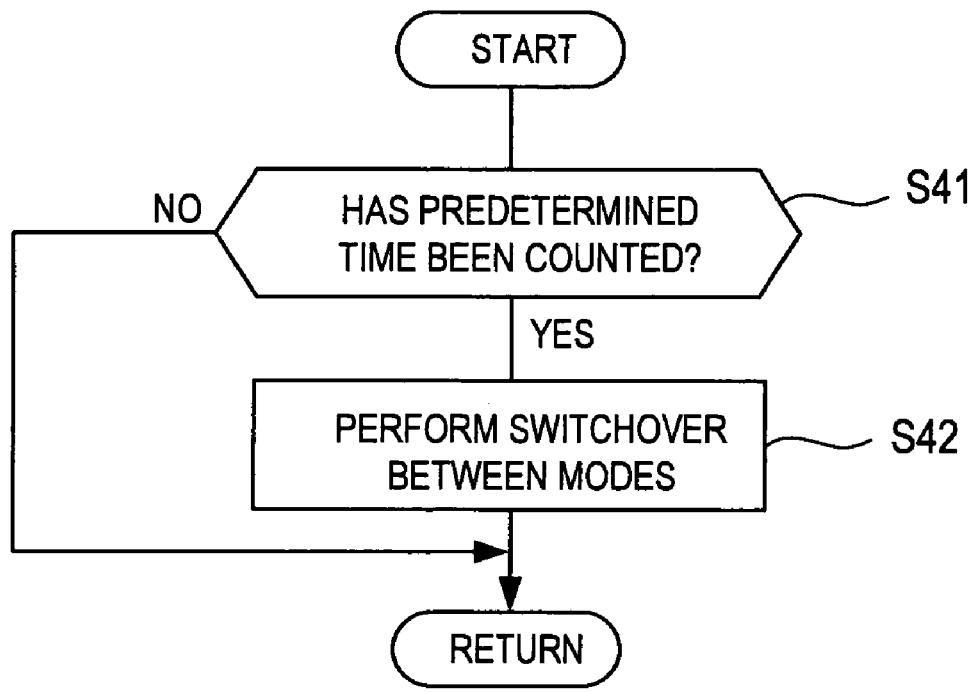
FIG. 17 is a flowchart outlining the switchover between two two-phase modulation modes.
Figure 18:
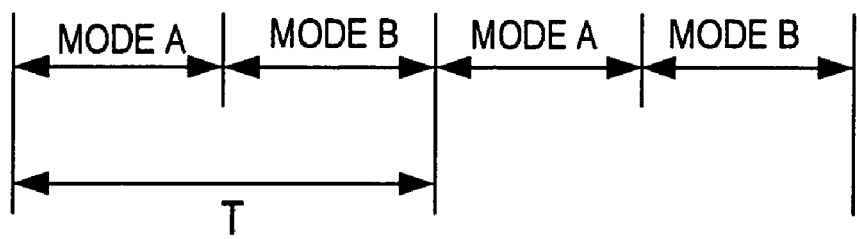
FIG. 18 is a timing chart explaining the switchover between two two-phase modulation techniques.

Thus, this "switchover determining block 187" operates as outlined in FIG. 17. It is determined if or not the timer count reaches a given value (step S41). And, when the determination is YES, the mode is changed from "mode A" to "mode B" or vice versa. This processing is performed every Δt seconds in the form of timer interrupt, for example. Hence, as shown in FIG. 18, the modes A and B are repeated in turn at regular intervals, in which each of the modes A and B is carried out to continue for the same predetermined period of time. Thus a total period of time T corresponding to the one-time mode A and the one-time of mode B is constant at any time. However, as a variation, the total period of time T can be changed every cycle, as long as averaged execution times under the modes A and B are approximately equal to each other.

It is preferable that a switching frequency at which both the modes A and B are selectively switched is set to be outside the range of audio frequencies.

Moreover, in cases the foregoing bootstrap circuit can be used as the power supply for driving the upper arm elements 102 of the inverter 7, it is preferred that the inverter 7 is activated by, at first, fixing a lower arm element 101 at its on state. It is still preferable that, immediately after the inverter 7 is started up, immediately after the inverter 7 is started up, the first period of time during which the lower arm element 101 fixed in its on state (i.e., with no switching).

The "fixed-phase determining block 188" responds to the two-phase modulation mode given by the above "switchover determining block 187" so as to determine a phase to be fixed. The determined phase is in conformity to the determined two-phase modulation mode. That is, using the three-phase voltage commands U*, V* and W*, the block 188 decides a phase to be fixed and a timing during which tile phase is fixed.

Accordingly, the block 188 engages in demanding fixing a phase voltage command for the two-phase modulation depending on a selected one between the "2π/3-fixing technique" with the "upper-arm fixing technique" and the "2π/3-fixing technique" with the "lower-arm fixing technique." In the former, as shown in FIG. 15, of the three-phase voltage commands U*, V* and W*, a specified one command whose amplitude is the highest during a period of 120 degrees each specified is fixed at 1 (duty 100%) and the remaining two commands are shifted to produce sinusoidal waves of the three-phase phase-to-phase voltages. In contrast, in the latter, as shown in FIG. 16, of the three-phase voltage commands U*, V* and W*, a specified one command whose amplitude is the lowest during a period of 120 degrees each specified is fixed at zero (duty 0%) and the remaining two commands are shifted to produce sinusoidal waves of the three-phase phase-to-phase voltages.

Further, the command computing block 189 is identical to that shown in FIG. 1 except for receiving information indicating the determined two-phase modulation mode from the block 87.

As described above, in the present embodiment, the "2π/3-fixing technique" with the "upper-arm fixing technique" and the "2π/3-fixing technique" with the "lower-arm fixing technique" are performed alternately in the condition that the average period of time set to both the modes are approximately equal to each other. It is therefore possible to suppress variations in temperature increasing at both the upper and lower arm elements 102 and 101. This means that the maximum temperatures at all the switching elements of the inverter 7 cam be lowered, thus leading to a mechanically simplified and compact cooling system for the inverter 7.

(Sixth Embodiment)

Figure 20:
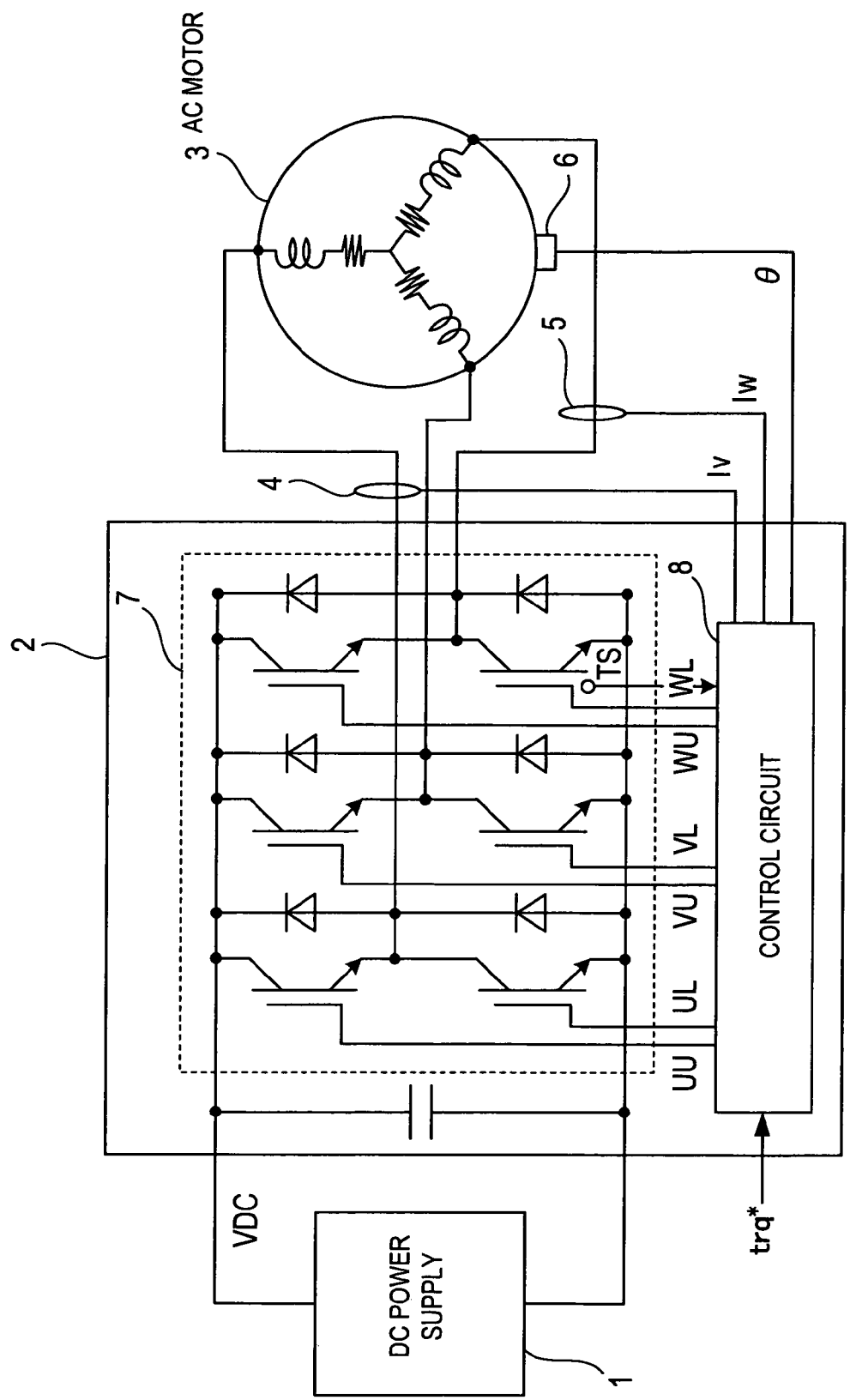
FIG. 20 shows an outlined electric configuration of a motor apparatus equipped with a motor control apparatus according to an eighth embodiment and other embodiments of the present invention.

Referring to FIGS. 14 and 20, a sixth embodiment of the motor control apparatus according to the present invention will now be described.

The present embodiment is concerned with the mode switchover involving detection of temperature at some arm elements of the inverter 7. That is in place of assigning the same performance period of time to each of the modes A and B, one or more temperature sensor is placed for the mode switchover control. As shown in FIG. 20, a temperature sensor TS is arranged near to a lower arm elements 101 to provide a signal Sts indicative of actual temperature to the control circuit 8.

In the control circuit 8, the "switchover determining block 187" is designed, instead of the foregoing, to receive the signal Sts from the temperature sensor (refer to the chain double-dashed line in FIG. 14) and to order the upper arm elements 102 to be fixed on (i.e., mode A) for only a predetermined period of time if the actually detected temperature is over a given temperature. The predetermined period of time is set such that the temperature at the upper arm elements to be subjected to the "on" fixing operation is within an allowable maximum temperature.

Thus, while giving priority to the lower arm elements 101 necessary for stable output of the foregoing bootstrap circuit, an increase in the temperature of only the lower arm elements 101 is checked to suppress it with the aid of fixing the upper arm elements 102 at the on states.

The temperature sensor TS may be arranged near to each lower arm element 101 for the above control.

A variation as to this embodiment can be provided, in which the temperature sensor TS can be arranged near to both the upper and lower arm elements respectively and, when either one-side temperature sensor detects a signal whose amount exceeds a given threshold, the foregoing switchover control is made.

Further, the temperature sensor is not a must, but it is possible to estimate the temperature at the upper and/or lower am elements by computation. This computation is done with the use of the detected values of phase currents and both torque and the number of rotations correlated with the phase currents. In this estimation, ambient temperature can be takers into account to raise the precision of the temperature estimation.

Still further, the foregoing on-fixing control can be altered as well. In cases where the temperature at the lower arm element 102 reaches the given threshold in the foregoing embodiment, the upper and lower arm elements 102 and 101 may be fixed in their on states (i.e., with no switching) in an alternate fashion. Alternatively, a difference between the temperatures at the upper and lower arm elements 102 and 101 is equal to or larger than a desired threshold, the upper and lower arm elements 102 and 101 may be fixed in their on states alternately.

(Seventh Embodiment)

Referring to FIGS. 20 and 18, a seventh embodiment of the motor control apparatus according to the present invention will now be described.

This embodiment still concerns with the mode control on the detected temperature. It is supposed that, in the inverter 7, a cooling condition for the upper arm elements 102 is sometimes arranged to be inferior to that for the lower arm elements. Such a cooling condition can be compensated by the present embodiment. Practically, in such a condition, the period of time during which the lower arm elements 101 (mode A) are fixed in the on states is made longer than that which the upper arm elements 102 are fixed in the on states (mode B).

Thus, imbalance between the temperatures at both the upper and lower arm elements 102 and 101 can be lessened, whereby the on-fixed period for the lower arm elements 101, which play a significant role in stabilizing the outputs from the bootstrap circuit, can be made longer.

(Eighth Embodiment)

Figure 19:
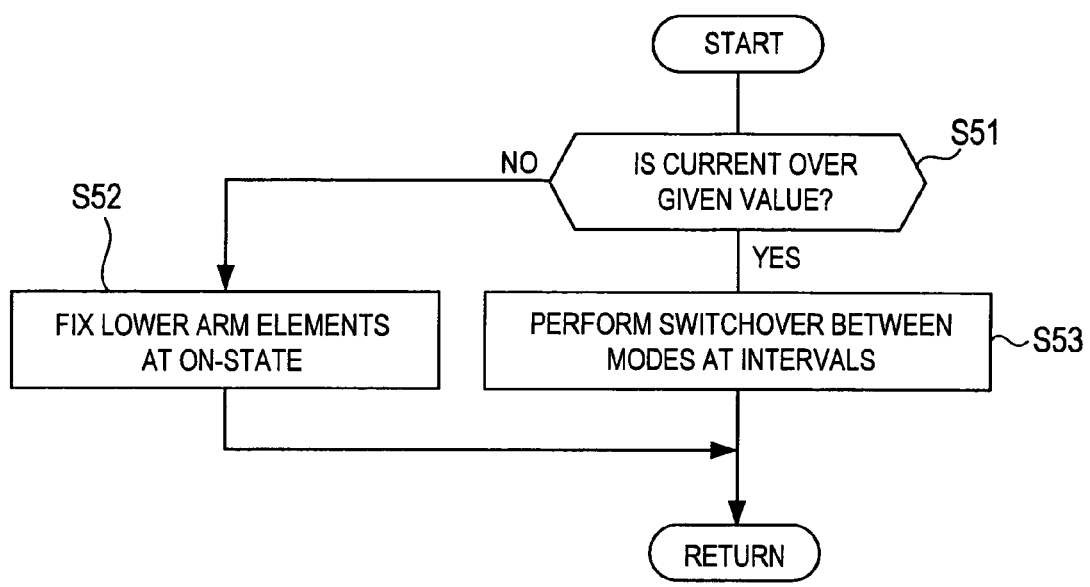
FIG. 19 is a flowchart outlining the switchover between two two-phase modulation modes as well as switching on the arm elements.

Referring to FIG. 19, an eighth embodiment of the motor control apparatus according to the present invention will now be described.

The present embodiment relates to the mode switching control on the basis of the phase current. When the phase current is less than a predetermined value, the lower arm elements 101 are fixed on (mode B; steps S51 and S52 in FIG. 19). However, the phase current equal to or more than the predetermined value, the modes A and B are repeated at regular intervals in an alternative manner. This is effective for making the outputs of the bootstrap circuit stable in the case that the phase current is smaller.

Incidentally, the same mode switchover control as the above can be done using some other parameters, such as temperature at arm elements 102 and/or 101 and the torque of the motor 3.

(Ninth Embodiment)

Referring to FIG. 8, a ninth embodiment of the motor control apparatus according to the present invention will now be described.

The present embodiment provides the bootstrap circuit shown in FIG. 8, in which the lower arm element 101 of the inverter is fixed in its on-state, whereby a potential at the point connecting the lower and upper arm elements 101 and 102 is obliged to be reduced at intervals. Thus the capacitor 103, which serves as a power supply powering the driver 100 for the upper arm element 102, is charged via the diode D responsively to voltage VN across the power supply 104 for the lower arm element 101. A reduction in the power-supply voltage from the bootstrap circuit can be suppressed.

In using this bootstrap circuit, a predetermined operating condition is detected to fix the upper arm elements at the on states every interval. Such a predetermined operating condition means a situation in which it is determined that the temperature at the lower arm elements to be fixed on has exceeded a given temperature.

(Tenth Embodiment)

A tenth embodiment of the motor control apparatus according to the present invention will now be described.

The present embodiment is characteristic of inserting a third mode based on the three-phase modulation between the modes A and B. The number of PMW switching times becomes fewer per one cycle of a sinusoidal current to be fed to the motor 3 in cases the number of rotations of the motor 3 is high. If the switchover between the modes A and B is made at intervals corresponding to approximate half the one cycle of the current, the number of PWM switching times is reduced. In this case, a period of time during which the three-phase modulation is performed is inserted between the intervals for the modes A and B. This insertion makes it possible to temporarily increase the number of PWM switching times, thereby providing an improved compliance of controlling the currents. Accordingly, there can be provided one solution to drawbacks, such as vulnerability to disturbances including fluctuations in the torque of the motor, which tends to occur when the number of PWM switching times is extremely few.

(Eleventh Embodiment)

Referring to FIG. 20, an eleventh embodiment of the motor control apparatus according to the present invention will now be described.

The present embodiment concerns dedicated use of the mode B (i.e., the "$2\pi/3$-fixing technique" with the "lower-arm on-fixing technique"), and a mode in which the two-phase modulated operation with the "$\pi/3$-fixing technique" (refer to FIG. 7) is carried out. The former technique is dedicatedly used under operation conditions (e.g., conditions of current, temperature, and/or torque) with no worry about an increase in temperature at the switching elements, while the latter technique is dedicatedly used if there is a concern about an increase at the lower arm elements of the inverter 7. This control is a substitute for the above alternate switchover between the techniques involving the upper and lower arm elements respectively switched.

When the two-phase modulated operation with the "π/3-fixing technique" is carried out, the "π/3-fixing technique" is applied to both the upper arm elements and lower arm elements respectively in an alternate fashion, which thus resists occurrence of fluctuations in temperature at the upper and lower arm elements.

Especially, the foregoing two-phase modulation which have been made reference in the fifth to ninth and eleventh embodiments has a higher effect, if the three-phase AC motor 3 operates in a range of speeds from a very low speed to a lower speed (the frequency of a motor phase-current is about 100 Hz or less).

(Summaries of the Embodiments)

Summaries about the foregoing embodiments can be listed as follows, in the form of comparison with the various modes of the present invention.

As first, the first to fourth embodiments will now be summarized.

(1) In the motor control apparatus including an apparatus for controlling a three-phase AC motor, when the phase voltage is larger, the π/3-fixing technique is employed in place of the conventional the 2π/3-fixing technique. Thus, the loss due to switching of the inverter, especially, such a loss caused in a motor rotation region of powering, large-torque, and high-speed, can be reduced, whereby an operation efficiency of the motor can be improved.

(2) In another mode according to the apparatus for the three-phase AC motor, the switchover is made between the three-phase modulation and the two-phase modulation based on the q-axis and d-axis currents iq and id, instead of using the amplitude of the phase voltage, unlike the foregoing. Precisely, a map representing the q-axis and d-axis currents iq and id is used such that, in a case where the absolute values of those currents are smaller (in other words, in an operation region where the amplitude of three-phase voltages defined by the q-axis and d-axis currents iq and id is smaller), the three modulation is used. However, in the opposite case to the above, the two-phase modulation is carried out. This two-phase modulation technique may be either the 2π/3-fixing or π/3-fixing technique.

This way of switching the fixing technique makes it possible to simplify the switchover and improve the accuracy in the switchover. The q-axis and d-axis currents iq and id have essentially less fluctuations, compared to the amplitudes of the phase voltages. Thus using such currents iq and id makes it possible that such fluctuations are detected with stability and ease, improving the precision of the switchover.

(3) In another mode according to the apparatus for the three-phase AC motor, the two-phase modulation may also be performed using a map defined by the torque and the number of rotations of the motor (i.e., a function of which variables are torque and the number of rotations). In operation ranges where the absolute values of those variables (i.e., operation ranges where the amplitudes of three-phase voltages defined by the torque and the number of rotations are smaller), the three-phase voltages are outputted to the motor. In the opposite cases to the above, the switchover control is shifted to the two-phase modulation.

This way enables the switchover to be executed with ease and precision. Moreover the π/3-fixing technique that largely improves the switching loss can be utilized to the fullest. Compared to the amplitude of the phase voltage, the torque and the number of rotations provide less fluctuation by nature and their fluctuations can be detected easily and stably. Hence precision in the switchover control can be improved, widening a control range to which the π/3-fixing technique can be applied suitably.

(4) Another mode according to the apparatus for the three-phase AC motor normally employs, as the two-phase modulation technique, the π/3-fixing technique, not the conventional 2π/3-fixing technique. Thus, the loss due to switching of the inverter, especially, such a loss caused in a motor rotation region of powering, large-torque, and high-speed, can be reduced, whereby an operation efficiency of the motor can be improved. In addition, the 2π/3-fixing technique, which has high changeover precision, is employed instead, in cases where the phase voltage is so small in its amplitude that the phases to be fixed cannot be changed with precision.

(5) Other preferred modes are as follows. By way of example, of the pairs each consisting of an upper arm element and a lower arm element which are in charge of outputting a phase voltage to be fixed, the 2π/3-fixing technique allows the upper arm element to be fixed in its off-state and the lower arm element to be fixed in its on-state. This fixing control will cause no operational problem in a bootstrap circuit powering a driver circuit to drive the upper arm elements, even if the upper arm elements are composed of NMOS transistors or IBGTs.

Further, immediately after the start of the inverter that provides the three-phase AC motor with the three-phase voltages, all the upper arm elements are switched off and all the lower a elements are switched on. Hence, even when the upper arm elements are composed of such elements as NMOS transistors or IGBTs, like the lower arm elements, no problems will be caused in the operation of a bootstrap circuit.

Furthermore, when the inverter is stopped, all the upper arm elements are switched off and all the lower arm elements are switched on. This causes the driver to be in its standby, thus preventing an operation error of the bootstrap circuit. Meanwhile, when detection is made such that the inverter providing the three-phase AC motor with the three-phase voltages subjected to the two-phase modulation has caused an error in its operations, all the upper arm elements are switched on and all the lower arm elements are switched off, which prohibits the inverter from operating. In this case, an internal capacitor in the bootstrap circuit is left without being charged, so that no error will occur in the bootstrap circuit.

The two-phase modulated motor control technique can be applied to an electric motor for running an automobile, in which the energy loss will be largely reduced.

Secondly, the fifth to eleventh embodiments will now be summarized.

A problem concerning with an increase in temperature at the switching elements of the inverter will detailed. When using the two-phase modulation on the 2π/3-fixing technique, imbalance will occur between loss (i.e., heat generation) at the upper arm elements and loss (i.e., heat generation) at the lower arm elements. This means that, of the switching elements of the inverter, an element subjected to the maximum loss (i.e., heat generation) cannot attain a sufficient reduction in the loss, even though the inverter undergoes a reduction in the loss as a whole.

This will be detained by exemplifying the upper arm elements sequentially fixed in their on-states (i.e., no switching) at intervals of an electrical angle of 2π/3.

The resistive loss (simply loss) of a switching element has a total of steady loss (on loss) and transient loss, The steady loss is resistive loss caused when the switching element is switched on, while the transient loss is resistive loss caused during a transient period (state transition period) between the on- and off-states of each lower arm element. Under normal conditions, it is said that the transient loss due to heat generation from the lower arm element driven on a PWM manner is larger than that from the upper arm element always fixed in its on-state.

However, a flywheel current which flows after turning off the lower arm element on the PWM control is made to flow through diodes attached to both of the on-fixed upper arm element and the upper arm elements for the other phases. Additionally, the total current of currents flowing through lower arm elements for two phases passes, in a mass, the on-fixed upper arm element for the remaining one phase. As a result, the resistive loss, that is, heat generation, of the on-fixed upper arm element becomes greater than that of the lower arm element undergoing the PWM drive. Incidentally, the resistive loss is proportional to a square of current.

Accordingly, the above problem becomes noticeable when a MOS transistor, which is produced by mutually integrating a switching element and a flywheel diode, is employed as a, switching element in the inverter. In this configuration, an increase in the temperature of the upper arm element is accelerated, because such a temperature increase promotes an increase in the on-resistance of the upper arm element. Moreover, such an increase in the amount of generated heat from the upper arm element is forced to shortening a duration of current supply to protect the element from overheating. The shortened current-supply period deteriorates the positive-negative symmetry of the waveform of current to be supplied to the three-phase AC motor. This drawback further sets off increases of vibration (torque fluctuations) and noise of the motor.

In contrast, the fifth and eleventh embodiments can provide a two-phase modulation technique capable of reducing, compared to the conventional, a maximum temperature of each switching inverter without increasing a cooling performance for the inverter.

(6) To be specific, as another mode of the according to the apparatus for the-three-phase AC motor, the two-phase modulation on the $2\pi/3$-fixing technique is performed with switchovers between two techniques. One technique is to use an upper-arm fixing technique that causes less heat generation at the lower arm element, compared to that of the upper arm element. The other technique is to use a lower-arm fixing technique that causes larger heat generation at the lower arm element, compared to that of the upper arm element. Both the upper-arm and lower-arm fixing techniques are switched over appropriately or executed at intervals in an alternative manner. Thus it is possible that variations between the amounts of generated heat at the upper arm elements and the lower arm elements are lowered, resulting in that the maximum temperatures of the switching elements of the inverter can be decreased in a well controlled manner, compared to the conventional.

The above decrease in the maximum temperatures of the switching elements is also useful for alleviating the performance of the cooling system mounted to the inverter. The entire motor control apparatus can therefore be made compact in size and saved in weight.

By way of example, the two-phase modulation on the upper-arm fixing technique with the $2\pi/3$ fixing and the two-phase modulation on the lower-arm fixing technique with the $2\pi/3$ fixing is equal or approximately equal in a duration of executing each modulation technique to each other. This allows the amounts of generated heat at both the upper and lower arm elements to be approximately equal to each other, with the result that the temperatures of both the upper and lower arm elements becomes approximately equal to each other. In the embodiments, the "approximately equal" referred herein should be interpreted so as to give an error of ranging from −30% to +30% to an amount of heat to be generated. The above execution time should be measured as mean values. In addition, for a short period of time through which the temperature is averaged, amounts of heat to be generated can be assigned to values residing outside the above range. Of course, alternately selecting the upper-arm on fixing and the lower-arm on fixing at intervals is simple in the control, and is most suitable.

Preferably, the above switchover can be made when the temperature or a corresponding amount to the temperature at either the upper and lower arm elements (i.e., at an arm element to be subjected to the on-fixing; i.e., at an element that receives no PWM switching). In this case, when the temperature at an element which has been fixed in its on-state reaches a given value, the switchover is made to the other element. Thus, with keeping the elements secure, the degree of freedom in selecting an element to be fixed in its on-state can be raised. The corresponding amount to the temperature may be current or its functional value (e.g., an average of currents). Alternatively, parameters with respect to current, such as torque or the number of rotations, may be used as well. An output from a temperature sensor secured on an arm element may be used as such a parameter. In using the current as the parameter, a vector sum of q-axis and d-axis current commands Iq* and Id* or a functional value to the vector sum may be used.

These variations for the various parameters can be applied to the switchover done by applying a given value to a difference between the temperatures and corresponding values thereto of the upper and lower arm elements. This is able to limit temperature variations of the upper and lower arm elements into a given range.

The upper and lower arm elements may be arranged in a mutually separate manner in an inverter, in which one-side elements are nearer to a high-temperature source or poorer in a cooling mechanism than the other-side elements. In this case, it is preferred that the elements arranged in such a temperature-disadvantageous environment is subject to on-fixing whose duration is shorter in average than that for the other elements if the motor is in powering operation. This can suppress rises in the temperature of the temperature-disadvantageous elements, thus reducing variations in the temperature of the switching elements of an inverter, while still lowering a maximum temperature thereof When the motor is in regenerating operation, the elements arranged in such a temperature-disadvantageous environment is subject to off-fixing whose duration is shorter in average than that for the other elements. Like the above on-fixing, this is also effective in suppressing the temperature variations and their maximum temperature rises.

In cases where an external environmental temperature is low or the inverter is in an early stage after its activation, it is not necessary to pay so much attention to the temperature rises of the elements. Thus another preferred technique is that the foregoing switchover between the operation modes can be stopped for simplifying the control and reducing noise caused by the switching.

When the upper and lower arm elements of an inverter are made up of MOS transistors, a flywheel current caused in response to switching off the element under PWM control is made to flow through a parasitic diode of a MOS transistor which is in on-fixing. This increases heat generation at the on-fixing MOS transistor. Thus it is possible to raise the effect to reduce temperate variations.

Preferably, the frequency of switchovers between the two-phase modulation techniques that use the upper-arm fixing technique on the 2π/3-fixing and the lower-arm fixing technique on the 2π/3-fixing, respectively, is set to a value residing outside an audible frequency range. This audible frequency range can normally be set to a range of 40–15000 Hz, but can still be considered a range of 20–20000 Hz. Noise caused by switching the elements can therefore be reduced.

Still preferably, a bootstrap circuit can be used to power a driver for the upper arm elements. In this circuit, a preferred basic control is to perform the on-fixing with the lower arm elements, wherein the on-fixing control of the lower and upper arm elements is conducted alternatively only when it is found that the temperature of the lower arm elements has risen excessively. In this case, the switchover may be moved to on-fixing the upper arm elements for a predetermined period of time.

This allows the bootstrap circuit to be simplified, because it can power the driver for the upper arm elements. This is because, in the configuration shown in FIG. 8, each lower arm element can be fixed in its on-state and the capacitor can be charged again by the power supply via the diode before the discharge from the capacitor has influence on the operations of the driver for the upper lower arm elements.

Incidentally, when the bootstrap circuit is used, the upper arm elements are designed to operate on a source follower manner (normally for NMOS transistors) or an emitter follower manner. In the case of making the upper arm elements operate on the source follower operation, it is sometimes difficult to greatly increase the gate voltage. In this case, compared to MOS transistors serving as the lower arm elements operating with the source grounded, the on-resistance of the upper arm elements (MOS transistor) operating on the source follower manner tends to be larger. Thus, in such a situation, it is desired that an average of an on-fixing duration for the upper arm elements is a little smaller than that for the lower arm elements, resulting in suppression of increases in amounts of heat generated from the upper arm elements.

Still preferably, the three-phase modulation can be set between the upper-arm-fixing and 2π/3-fixing technique for the two-phase modulation and the lower-arm-fixing and 2π/3-fixing technique for the two-phase modulation. This is effective for preventing the current from fluctuating, especially when the number of rotations of the motor is high to the extent that the number of PWM switching times per one cycle of a sinusoidal wave current to be fed to the motor becomes less considerably.

Still, a determination may be made such that the temperature at the lower arm elements has risen excessively under the lower-arm-element on-fixing 2π/3-fixing technique for the two-phase modulation, which is suitable for the stable operation of the bootstrap circuit. In this case, instead of alternative changeovers between the two-phase modulations respectively involving the upper-arm element and lower-arm element to be feed in their on-states, a two-phase modulation using the π/3-fixing technique can be conducted. It is therefore to well reduce a rise in the temperature of the lower arm elements which are put in operation under the 2π/3-fixing technique with the lower arm elements on-fixed.

The present invention may be embodied in several other forms without departing from the spirit thereof. The present embodiments as described is therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims. For example, the current sensor and rotation number sensor may be omitted to provide a sensor-less type of three-phase AC motor, as long as information inactive of such physical quantities can be obtained by computation or any other means.

What is claimed is:

1. An apparatus for controlling a three-phase AC motor, comprising:
    an inverter operatively connected to the motor to power the motor in response to a three-phase PWM command; and
    a control circuit controlling the inverter based on two modulation techniques selectively switched from one the other depending on information indicative of an operation state of the motor, one of the two modulation techniques giving the PWM command a two-phase modulation allowing each of three phase voltages of the motor to be fixed at a predetermined voltage level in turn at intervals of an electrical angle of π/3.

2. The apparatus according to claim 1, wherein
    the information indicative of the operation state of the motor is a phase voltage of the motor and
    the other of the two modulation techniques giving the PWM modulation a three-phase modulation; and
    wherein the control circuit includes
    determination means determining whether or not the phase voltage is equal to or larger than a given value and
    commanding means selectively commanding the three-phase modulation in cases where it is determined that the phase voltage is less than the given value and the two-phase modulation in cases where it is determined that the phase voltage is larger than the given value.

3. The apparatus according to claim 2, wherein the motor is an on-vehicle motor producing power for running the vehicle.

4. The apparatus according to claim 1, wherein
    the information indicative of the operation state of the motor is a phase voltage of the motor and
    the other of the two modulation techniques giving the PWM modulation a further two-phase modulation in which each of three phase voltages of the motor is fixed in turn at a predetermined voltage level at intervals of an electrical angle of 2π/3; and
    wherein the control circuit includes
    determination means determining whether or not the phase voltage is larger than a given value and
    commanding means selectively commanding the further two-phase modulation in cases where it is determined that the phase voltage is less than the given value and the two-phase modulation in cases where it is determined that the phase voltage is larger than the given value.

5. The apparatus according to claim 4, wherein the inverter is equipped with three element pairs each including an upper arm element and a lower upper element either of which is subjected to output of the phase voltage to be fixed at the predetermined voltage level and a bootstrap circuit to drive the upper arm element
    wherein the further two-phase modulation allowing not only the upper arm element to be fixed in a switched-off state thereof but also the lower arm element to be fixed in a switched-on state thereof.

6. The apparatus according to claim 4, wherein the inverter is equipped with three element pairs each including an upper arm element and a lower upper element either of which is subjected to output of the phase voltage to be fixed at the predetermined voltage level and a bootstrap circuit to drive the upper arm element wherein the control circuit has means detecting a start of the inverter and means commanding all the upper arm elements to be switched off and all the lower am elements to be switched on when it is detected that the inverter has started to operate.

7. The apparatus according to claim 4, wherein the inverter is equipped with three element pairs each including an upper arm element and a lower element either of which is subjected to output of the phase voltage to be fixed at the predetermined voltage level and a bootstrap circuit to drive the upper arm element wherein the control circuit has means detecting a stop of the inverter and means commanding all the upper arm elements to be switched off and all the lower am elements to be switched on so that the inverter becomes a standby state, when it is detected that the inverter has stopped operating.

8. The apparatus according to claim 4, wherein the inverter is equipped with three element pairs each including an upper arm element and a lower element either of which is subjected to output of the phase voltage to be fixed at the predetermined voltage level and a bootstrap circuit to drive the upper arm element wherein the control circuit has means detecting an error of the inverter and means commanding all the upper arm elements to be switched on and all the lower arm elements to be switched off so that the inverter is prohibited from being operated, when it is detected that the inverter has the error.

9. The apparatus according to claim 4, wherein the motor is an on-vehicle motor producing power for running the vehicle.

10. An apparatus for controlling a three-phase AC motor, comprising:

an inverter operatively connected to the motor to power the motor in response to a three-phase PWM command; and a control circuit controlling the inverter based on two modulation techniques selectively switched from one the other depending on information indicative of an operation state of the motor, one of the two modulation techniques giving the PWM command a two-phase modulation, the other of the two modulation techniques giving the PWM command a three-phase modulation, the information indicative of the operation state of the motor being defined as a map having a two-dimensional coordinate with four quadrants, and the map including a first region containing an origin of the coordinate and ordering the three-phase modulation and a second region surrounding the first region in the coordinate and ordering the two-phase modulation.

11. The apparatus according to claim 10, wherein the control circuit includes memorizing means memorizing the map;

acquiring means acquiring the information indicative of an operation state of the motor;

determining means determining which one of the two-phase and three-phase modulations is to be selected, by determining that the acquired information falls into which region on the map.

12. The apparatus according to claim 10, wherein the information is a two-dimensional coordinate point decided by a q-axis current and a d-axis current in the motor and the coordinate of the map is defined by mutually-orthogonal two axes assigned to the q-axis and d-axis currents.

13. The apparatus according to claim 12, wherein the two-phase modulation allows each of three phase voltages of the motor to be fixed at a predetermined voltage level in turn at intervals of an electrical angle of $\pi/3$.

14. The apparatus according to claim 10, wherein the information is a two-dimensional coordinate point by an amount of torque caused in the motor and the number of rotations of the motor and the coordinate of the map is defined by mutually-orthogonal two axes assigned to the torque and the number of rotations.

15. The apparatus according to claim 14, wherein the two-phase modulation allows each of three phase voltages of the motor to be fixed at a predetermined voltage level in turn at intervals of an electrical angle of $\pi/3$.

16. The apparatus according to claim 14, wherein the map has the two-dimensional coordinate with the four quadrants consisting of a first quadrant expressing a forward rotation and powering state, a second quadrant expressing a backward rotation and regenerating state, a third quadrant expressing a backward rotation and powering state, and a fourth quadrant expressing a forward rotation and regenerating state.

17. The apparatus according to claim 16, wherein the first region in the coordinate defines amounts of the torque at the same rotational direction and the same number or rotations such that a torque amount defined in the quadrants expressing the regeneration is larger than a torque amount defined in the quadrants expressing the powering.

18. The apparatus according to claim 17, wherein the first region in the coordinate is defined such that part of the first region in the first quadrant has an approximately equal rotational symmetry with pat of the first region in the third quadrant and part of the fourth region in the first quadrant has an approximately equal rotational symmetry with pat of the second region in the third quadrant.

19. The apparatus according to claim 17, wherein the first region in the coordinate is defined such that part of the first region in the first quadrant has an approximately equal rotational symmetry with pat of the first region in the third quadrant and part of the fourth region in the first quadrant has an approximately equal rotational symmetry with pat of the second region in the third quadrant.

20. An apparatus for controlling a three-phase AC motor, comprising:

an inverter operatively connected to the motor to power the motor in response to a three-phase PWM command; and a control circuit controlling the inverter based on two modulation techniques selectively switched from one the other depending on information indicative of an operation state of the motor, one of the two modulation techniques giving the PWM command a first two-phase modulation that allows each of three phase voltages of the motor to be fixed at a predetermined voltage level in turn at intervals of an electrical angle of $2\pi/3$, the other of the two modulation techniques giving the PWM command a second two-phase modulation that allows each of three phase voltages of the motor to be fixed at a predetermined voltage level in turn at intervals of an electrical angle of $\pi/3$.

21. The apparatus according to claim 20, wherein the information is an amplitude of a phase voltage of the motor wherein the control circuit include first determining means for determining whether or not the amplitude of the phase voltage is equal to or larger than a given threshold and commanding means for commanding the first two-phase modulation when it is determined that the amplitude of the phase voltage is less than the threshold and the second two-phase modulation when it is determined that the amplitude of the phase voltage is equal to or larger than the threshold.

22. The apparatus according to claim 20, wherein the information indicative of the operation state of the motor being defined as a map having a two-dimensional coordinate with four quadrants, and the map including a first region containing an origin of the coordinate and ordering the three-phase modulation and a second region surrounding the first region in the coordinate and ordering the two-phase modulation.

23. The apparatus according to claim 22, wherein the information is a two-dimensional coordinate point decided by a q-axis current and a d-axis current in the motor and the coordinate of the map is defined by mutually-orthogonal two axes assigned to the q-axis and d-axis currents.

24. The apparatus according to claim 22, wherein the information is a two-dimensional coordinate point by an amount of torque caused in the motor and the number of rotations of the motor and the coordinate of the map is defined by mutually-orthogonal two axes assigned to the torque and the number of rotations.

25. The apparatus according to claim 24, wherein the map has the two-dimensional coordinate with the four quadrants consisting of a first quadrant expressing a forward rotation and powering state, a second quadrant expressing a backward rotation and regenerating state, a third quadrant expressing a backward rotation and powering state, and a fourth quadrant expressing a forward rotation and regenerating state.

26. The apparatus according to claim 25, wherein the first region in the coordinate defines amounts of the torque at the same rotational direction and the same number or rotations such that a torque amount defined in the quadrants expressing the regeneration is larger than a torque amount defined in the quadrants expressing the powering.

27. The apparatus according to claim 20, wherein the inverter is equipped with three element pairs each including an upper arm element and a lower arm element either of which is subjected to output of the phase voltage to be fixed at the predetermined voltage level and a bootstrap circuit to drive the upper arm element wherein the further two-phase modulation allowing not only the upper arm element to be fixed in a switched-off state thereof but also the lower arm element to be fixed in a switched-on state thereof.

28. The apparatus according to claim 20, wherein the inverter is equipped with three element pairs each including an upper arm element and a lower arm element either of which is subjected to output of the phase voltage to be fixed at the predetermined voltage level and a bootstrap circuit to drive the upper arm element wherein the control circuit has means detecting a start of the inverter and means commanding all the upper arm elements to be switched off and all the lower am elements to be switched on when it is detected that the inverter has started to operate.

29. The apparatus according to claim 20, wherein the inverter is equipped with three element pairs each including an upper arm element and a lower arm element either of which is subjected to output of the phase voltage to be fixed at the predetermined voltage level and a bootstrap circuit to drive the upper arm element wherein the control circuit has means detecting a stop of the inverter and means commanding all the upper arm elements to be switched off and all the lower am elements to be switched on so that the inverter becomes a standby state, when it is detected that the inverter has stopped operating.

30. The apparatus according to claim 20, wherein the inverter is equipped with three element pairs each including an upper arm element and a lower element either of which is subjected to output of the phase voltage to be fixed at the predetermined voltage level and a bootstrap circuit to drive the upper arm element wherein the control circuit has means detecting an error of the inverter and means commanding all the upper arm elements to be switched on and all the lower am elements to be switched off so that the inverter is prohibited from being operated, when it is detected that the inverter has the error.

31. The apparatus according to claim 20, wherein the motor is an on-vehicle motor producing power for running the vehicle.

32. An apparatus for controlling a three-phase AC motor, comprising:

an inverter operatively connected to the motor to power the motor in response to a three-phase PWM command, the inverter being equipped with three element pairs each including an upper arm element and a lower upper element each of which receives modulated voltages responding to the three-phase PWM command, a control circuit controlling the inverter based on a first and second two-phase modulation techniques selectively switched from one the other at intervals or alternately depending on information indicative of an operation state of the motor and each giving the PWM command a two-phase modulation that allows each of three phase voltages of the motor to be feed at a predetermined voltage level in turn at intervals of an electrical angle of $2\pi/3$, the first two-phase modulation technique involving the upper arm element assigned to a phase to be subjected to fixing the phase voltage being switched on and the lower arm element thereat being switched off and the second two-phase modulation technique involving the upper arm element assigned to a phase to be subjected to fixing the phase voltage being switched off and the lower arm element thereat being switched on.

33. The apparatus according to claim 32, wherein the first and second two-phase modulation techniques each involving the upper or lower arm element to be subjected to fixing the phase voltage is equal or approximately equal in a duration of executing each modulation technique to each other.

34. The apparatus according to claim 32, wherein the control circuit includes means obtaining either a temperature at either the upper or lower arm element subjected to fixing the phase voltage or a corresponding physical amount to the temperature, means determining whether or not either the temperature or the corresponding physical amount is over a given value, and means commanding the switchover between the first and second two-phase modulation techniques when it is determined that the temperature or the corresponding physical amount is over the given value.

35. The apparatus according to claim 32, wherein the control circuit includes means for obtaining information indicating that a difference between temperatures each caused at the upper and lower arm elements is over a given value and means commanding the switchover between the first and second two-phase modulation techniques when it is determined that the difference between the temperatures is over the given value.

36. The apparatus according to claim 32, wherein the control circuit includes means controlling the switchover such that, in cases where the motor is in a powering operating, of the upper and lower arm elements, an element located nearer to a high-temperature heating substance is averagely shorter in a duration of being switched on than an element located far from the high-temperature heating substance.

37. The apparatus according to claim 32, wherein the control circuit includes means controlling the switchover such that, in cases where the motor is in a regenerating operating, of the upper and lower arm elements, an element located nearer to a high-temperature heating substance is averagely shorter in a duration of being switched off than an element located far from the high-temperature heating substance.

38. The apparatus according to claim 32, wherein the control circuit includes means obtaining either a temperature at either the upper or lower arm element subjected to fixing the phase voltage or a corresponding physical amount to the temperature, means determining whether or not either the temperature or the corresponding physical amount is less than a given value, and means commanding a halt of the switchover between the first and second two-phase modulation techniques when it is determined that the temperature or the corresponding physical amount is less than the given value.

39. The apparatus according to claim 32, wherein the control circuit is configured to control the inverter based on the first and second two-phase modulation techniques selectively switched from one the other at a switching frequency set outside a range of audible frequencies.

40. The apparatus according to claim 32, wherein the upper and lower arm elements of the inverter are MOS transistors, respectively.

41. The apparatus according to claim 32, wherein the control circuit has a bootstrap circuit supplying a power-supply voltage to a driver driving the upper arm element assigned to each phase, wherein the bootstrap circuit comprises:
a power supply powering a driver for driving the lower arm element assigned to each phase,
a capacitor electrically connected between the driver for the upper arm element and a connection point connecting the upper and lower arm elements, and
a diode connected between the capacitor and the power supply to allow a flow of current from the power supply and the capacitor,
wherein the drivers for the upper and lower arm elements are controlled such that, after the upper arm element has been switched on, the lower arm element is switched on within a period of time that has no influence on an operation of the driver for the upper arm element.

42. The apparatus according to claim 32, wherein the control circuit is configured to interleave a period of time during which the inverter is controlled on a three-phase modulation, into two operations of the inverter controlled based on the first and second two-phase modulation techniques.

43. An apparatus for controlling a three-phase AC motor, comprising:

an inverter operatively connected to the motor to power the motor in response to a three-phase PWM command, the inverter being equipped with three element pairs each including an upper arm element and a lower upper element each of which receives modulated voltages responding to the three-phase PWM command, a control circuit controlling the inverter based on a first and second two-phase modulation techniques selectively switched from one the other depending on information indicative of an operation state of the motor and configured to give the PWM command a two-phase modulation that allows each of three phase voltages of the motor to be fixed at a predetermined voltage level in turn at intervals of an electrical angle of $2\pi/3$ and $\pi/3$, respectively, and the first two-phase modulation technique involving the upper arm element assigned to a phase to be subjected to fixing the phase voltage being switched on and the lower arm element thereat being switched off, wherein the switchover from the first two-phase modulation technique to the second two-phase modulation is made when either temperature at the arm element subjected to being switched on or a physical quantity corresponding to the temperature is over a given value.

* * * * *